United States Patent
Rodd et al.

(10) Patent No.: US 11,243,902 B2
(45) Date of Patent: Feb. 8, 2022

(54) INTRA-MODULE SERIAL COMMUNICATION INTERFACE FOR RADIO FREQUENCY DEVICES

(71) Applicant: QUALCOMM Incorporated, San Diego, CA (US)

(72) Inventors: Reza Rodd, San Diego, CA (US); Scott Davenport, Merrimack, NH (US); Umesh Srikantiah, San Diego, CA (US); ZhenQi Chen, South Boston, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/003,724

(22) Filed: Aug. 26, 2020

(65) Prior Publication Data

US 2021/0081348 A1    Mar. 18, 2021

Related U.S. Application Data

(60) Provisional application No. 62/899,223, filed on Sep. 12, 2019.

(51) Int. Cl.
  *G06F 13/40*    (2006.01)
  *G06F 13/42*    (2006.01)
  *H04B 1/40*     (2015.01)

(52) U.S. Cl.
  CPC ...... *G06F 13/4027* (2013.01); *G06F 13/4282* (2013.01); *H04B 1/40* (2013.01)

(58) Field of Classification Search
  CPC .... G06F 13/4027; G06F 13/4282; H04B 1/40
  See application file for complete search history.

(56) References Cited

U.S. PATENT DOCUMENTS

| | | | |
|---|---|---|---|
| 6,202,105 B1* | 3/2001 | Gates | G06F 13/385 710/1 |
| 6,233,640 B1* | 5/2001 | Luke | G06F 13/385 710/105 |
| 8,417,286 B2* | 4/2013 | Gorbachov | H04B 1/0064 455/553.1 |
| 9,946,681 B1* | 4/2018 | Jenkins | G06F 13/387 |
| 2011/0022783 A1* | 1/2011 | Moshayedi | G06F 13/385 711/103 |

(Continued)

OTHER PUBLICATIONS

International Search Report and Written Opinion—PCT/US2020/048260—ISA/EPO—dated Dec. 11, 2020.

*Primary Examiner* — Henry Tsai
*Assistant Examiner* — Christopher A Daley
(74) *Attorney, Agent, or Firm* — Qualcomm Incorporated

(57) ABSTRACT

Systems, methods, and apparatus for improving bus latency and reducing bus congestion are described. A data communication apparatus has a first interface circuit configured to couple the data communication apparatus to a primary serial bus, a second interface circuit configured to couple the data communication apparatus to a plurality of secondary serial buses, and a sequencer configured to respond to a first command received from the primary serial bus by initiating execution of a preconfigured sequence that causes a sequence of commands to be transmitted through the second interface circuit. The sequence of commands may be configured or selected to access registers in at least one device that is coupled to one of the secondary serial buses.

30 Claims, 16 Drawing Sheets

(56) References Cited

U.S. PATENT DOCUMENTS

| | | | |
|---|---|---|---|
| 2014/0136738 A1* | 5/2014 | Matlock | G06F 13/4027 710/104 |
| 2015/0331826 A1* | 11/2015 | Ghosh | G06F 13/4027 710/313 |
| 2018/0011715 A1* | 1/2018 | Mataya | G06F 13/4282 |
| 2018/0172666 A1* | 6/2018 | Chung | G01N 33/6893 |
| 2018/0278289 A1 | 9/2018 | Chu et al. | |
| 2018/0336159 A1* | 11/2018 | Kung | G06F 13/4282 |
| 2019/0129880 A1* | 5/2019 | Zhu | G06F 13/4282 |
| 2020/0183871 A1* | 6/2020 | Patzelt | G06F 13/4027 |

* cited by examiner

INTRA-MODULE SERIAL COMMUNICATION INTERFACE FOR RADIO FREQUENCY DEVICES

PRIORITY CLAIM

This application claims priority to and the benefit of U.S. Provisional Patent Application Ser. No. 62/899,223 filed in the U.S. Patent Office on Sep. 12, 2019, the entire content of this application being incorporated herein by reference as if fully set forth below in its entirety and for all applicable purposes.

TECHNICAL FIELD

The present disclosure relates generally to serial communication over a shared serial bus and, more particularly, to a high-speed, low-latency serial bus that can support radio frequency device operations.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus operated in accordance with an Inter-Integrated Circuit (I2C bus or I²C). The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal.

A serial bus may employ a multi-master protocol in which one or more devices can serve as a master and a slave for different messages transmitted on the serial bus. In one example, Improved Inter-Integrated Circuit (I3C) protocols may be used to control operations on a serial bus. I3C protocols are defined by the Mobile Industry Processor Interface (MIPI) Alliance and derive certain implementation aspects from the I2C protocol. In another example, the Radio Frequency Front-End (RFFE) interface defined by the MIPI Alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, the system power management interface (SPMI) defined by the MIPI Alliance provides a hardware interface that may be implemented between baseband or application processors and peripheral components. In some implementations, systems employ SPMI to support power management operations within a device.

In many instances, a multi-drop serial bus may be provided to support a combination of high-priority, low-latency communication and lower-priority communication. Latency can be adversely affected when multiple devices coupled to the serial bus are concurrently active and attempting to gain bus access for transmission initiation. Degraded latencies can lead to a failure to meet certain applications performance limits. As mobile communication devices continue to include a greater level of functionality, improved serial communication techniques are needed to accommodate high-priority, low-latency functions.

SUMMARY

Certain aspects of the disclosure relate to systems, apparatus, methods and techniques that can ease congestion on a multi-purpose, multidrop serial bus. Slave devices may be equipped with sequencer logic that can be configured to expand short commands received from a conventional multidrop serial bus by automatically generating a sequence of commands that access multiple registers in one or more downstream devices and/or that initiate actions in the downstream devices.

In various aspects of the disclosure, a data communication method performed at a slave device coupled to a serial bus includes communicating with a bus master through a first interface circuit configured to couple the slave device to a primary serial bus, communicating with one or more downstream devices through a second interface circuit configured to couple the slave device to a plurality of secondary serial buses, and responding to a first command received from the primary serial bus by initiating execution of a preconfigured sequence that causes a sequence of commands to be transmitted through the second interface circuit. The sequence of commands may be configured to access registers in at least one downstream device.

In one aspect, the sequence of commands includes a first command addressed to a register in a first downstream device coupled to a first secondary serial bus and a second command addressed to a register in a second downstream device coupled to a second secondary serial bus. In some instances, the sequence of commands includes a register write command, a register masked write command or a register read command. In some instances, the sequence of commands includes a trigger mask write command or a trigger command.

In one aspect, a first serial bus protocol is used to transmit data over the primary serial bus at a first data rate, and a second serial bus protocol may be used to transmit data over the plurality of secondary serial buses at a second data rate that is greater than the first data rate. In one example, the primary serial bus is operated in accordance with an RFFE protocol.

In certain aspects, the method includes receiving a second command from the primary serial bus, and initiating transmission of a third command over one of the plurality of secondary serial buses in response to the second command. Transmission of the third command may commence while the second command is being received. The method may include determining a type of the second command from a command code transmitted in second command, and commencing transmission of the third command after determining the type of the second command and before address information for the second command has been completely received.

In certain aspects, the method includes managing communication over the plurality of secondary serial buses, and using content of the first command to select the preconfigured sequence from one or more preconfigured sequences before the first command has been completely received. Each of the plurality of secondary serial buses may be configured as a point-to-point serial link.

In various aspects of the disclosure, a data communication apparatus has a first interface circuit configured to couple the data communication apparatus to a primary serial bus, a second interface circuit configured to couple the data communication apparatus to a plurality of secondary serial buses, and a sequencer configured to respond to a first command received from the primary serial bus by initiating execution of a preconfigured sequence that causes a sequence of commands to be transmitted through the second interface circuit. The sequence of commands may be configured or selected to access registers in at least one device that is coupled to one of the secondary serial buses. The data communication apparatus may be configured to operate as a slave device.

In various aspects of the disclosure, a data communication apparatus has means for communicating with a bus master through a first interface circuit configured to couple the data communication apparatus to a primary serial bus, means for communicating with one or more downstream devices through a second interface circuit configured to couple the data communication apparatus to a plurality of secondary serial buses, and means for executing a preconfigured sequence that causes a sequence of commands to be transmitted through the second interface circuit. The preconfigured sequence may be executed in response to a first command received from the primary serial bus. The sequence of commands may be configured to access registers in the one or more downstream devices. The data communication apparatus may be configured to operate as a slave device.

In various aspects of the disclosure, a processor-readable storage medium stores or maintains code for communicating with a bus master through a first interface circuit configured to couple a slave device to a primary serial bus, communicating with one or more downstream devices through a second interface circuit configured to couple the slave device to a plurality of secondary serial buses, and responding to a first command received from the primary serial bus by initiating execution of a preconfigured sequence that causes a sequence of commands to be transmitted through the second interface circuit. The sequence of commands may be configured to access registers in at least one downstream device.

In some examples, the sequence of commands includes a first command addressed to a register in a first downstream device coupled to a first secondary serial bus and a second command addressed to a register in a second downstream device coupled to a second secondary serial bus. The sequence of commands may include a register write command, a register masked write command or a register read command. The sequence of commands may include a trigger mask write command or a trigger command.

In some examples, a first serial bus protocol is used to transmit data over the primary serial bus at a first data rate, and a second serial bus protocol may be used to transmit data over the plurality of secondary serial buses at a second data rate that is greater than the first data rate. In some instances, the primary serial bus is operated in accordance with an RFFE protocol.

In some examples, the slave device may receive a second command from the primary serial bus and may initiate transmission of a third command over one of the plurality of secondary serial buses in response to the second command. Transmission of the third command may commence while the second command is being received. In some examples, the slave device may determine a type of the second command from a command code transmitted in second command and may commence transmission of the third command after determining the type of the second command and before address information for the second command has been completely received.

In some examples, the slave device may manage communication over the plurality of secondary serial buses. The slave device may use content of the first command to select the preconfigured sequence from one or more preconfigured sequences before the first command has been completely received. Each of the plurality of secondary serial buses may be configured as a point-to-point serial link.

DETAILED DESCRIPTION

Figure 1:
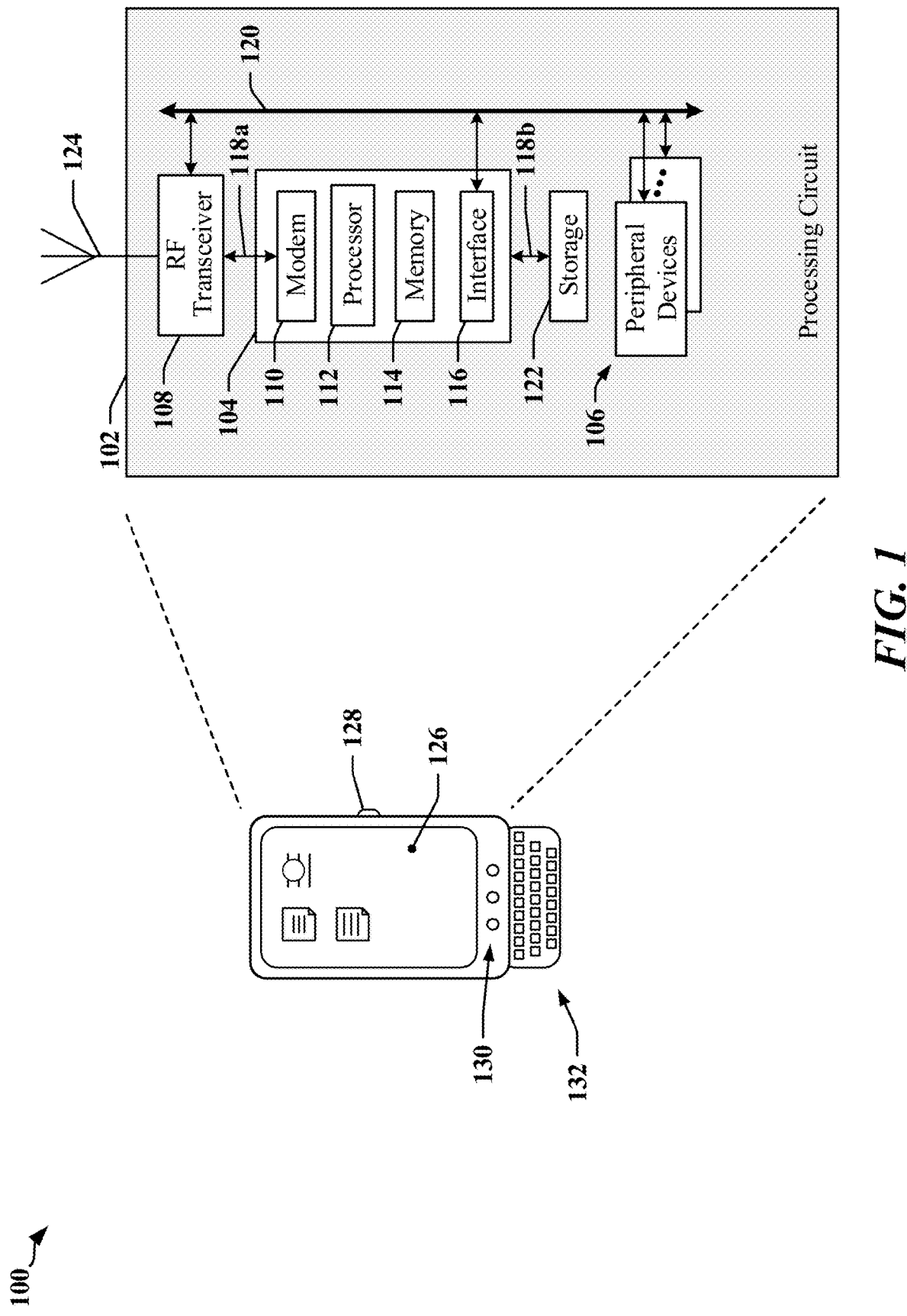
FIG. 1 illustrates an apparatus employing a data link between IC devices and that is selectively operated according to a standard or proprietary protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or another protocol. The serial bus may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration or command transmissions specified by protocol.

High bus latency can limit the capabilities and functionality of a serial bus in certain applications. In one example, bus latency considerations may limit the number of sensors that can be coupled by an I3C, RFFE or SPMI bus. For example, certain applications specify maximum delays for reading sensor information after occurrence of an event and/or in response to an interrupt, and may specify time limits in which multiple sensors are to be read. In another example, bus latency considerations may limit the number of RF devices that can be coupled by an I3C, RFFE or SPMI bus. Certain operations in radio frequency ICs require very low-latency communications. For example, configuration and reconfiguration of circuits used to drive multiple antennas may generate large volumes of messages, commands and signaling directed to multiple radio frequency components. In many instances, the messages may include configuration parameters that are to be applied at a time determined by a controlling device. Congestion and increased latencies can also result from communication overhead associated with certain protocols used to control the serial bus.

Advances in RF technology and the introduction of increased capabilities in communication devices increase pressure on latency times. For example, the deployment of radio access technologies such as the 5G New Radio technology defined by the 3rd Generation Partnership Project (3GPP) and the 802.11ax WLAN standard defined by the Institute of Electrical and Electronics Engineers (IEEE) 802.11 Working Group can require a 50% reduction in latency at conventional bus clock frequencies, increase complexity of RFFE bus architectures and increase the potential for traffic congestion on the bus. RFFE bus congestion and timing bottlenecks may be expected to exacerbate coexistence issues, for example. Increased bus activity may increase bus contention issues where RFFE bus timing is complicated. Bus contention events can increase when carrier aggregation is supported.

A serial communication interface implemented in accordance with certain aspects disclosed herein may be adapted to support command expansion. A device configured to operate as an expander receives a short command from a primary serial bus and responds by transmitting one or more commands over point-to-point secondary serial interfaces. In one example, the primary serial bus is operated in accordance with a general-purpose or standards-defined protocol. The short command received from the primary serial bus may cause a controller or sequencer in the expander to execute a sequence that causes the multiple commands to be transmitted to downstream devices through the point-to-point secondary serial interfaces. The expander may use preconfigured sequences to enable a system to perform complex operations without regard to the congestion of the primary serial bus. The secondary serial interfaces may be operated using a protocol optimized for latency and simplicity. For example, the secondary serial interfaces may operate with a simplified datagram structure, minimized protocol overheads and/or may provide dedicated communication links for certain downstream devices.

In one example, a radio frequency serial bus (RFSB) interface may be used to provide low latency communication to multiple RF devices. The increased complexity of RFFE bus architectures that are configured to support newer radio access technologies, including fourth generation (4G) and fifth generation (5G) wireless communication technologies, can add to the potential for traffic congestions on the RFFE bus. The expander may be coupled to a master device using an I2C protocol, I3C protocol, SPMI protocol and/or RFFE protocol, or another suitable protocol. The expander may be operable to relay data between the master device and the slave devices such that a high degree of synchronism between certain slave devices can be achieved. Multiple RFSB interfaces may be implemented to enable RFFE devices or other low-latency devices to communicate within tight time constraints, including where bus throughput, utilization and/or other operating characteristics are compromised by demands from low-latency slave devices.

According to certain aspects of this disclosure, a data communication apparatus adapted to implement the RFSB protocol has a first interface circuit configured to couple the data communication apparatus to a primary serial bus, a second interface circuit configured to couple the data communication apparatus to a plurality of secondary serial buses, and a sequencer configured to respond to a first command received from the primary serial bus by initiating execution of a preconfigured sequence that causes a sequence of commands to be transmitted through the second interface circuit. The sequence of commands may be configured or selected to access registers in at least one device that is coupled to one of the secondary serial buses.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include an SoC, or a processing circuit 102 having multiple circuits or devices 104, 106 and/or 108, which may be implemented in one or more ASICs. In one example, the apparatus 100 may operate as a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 or an external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
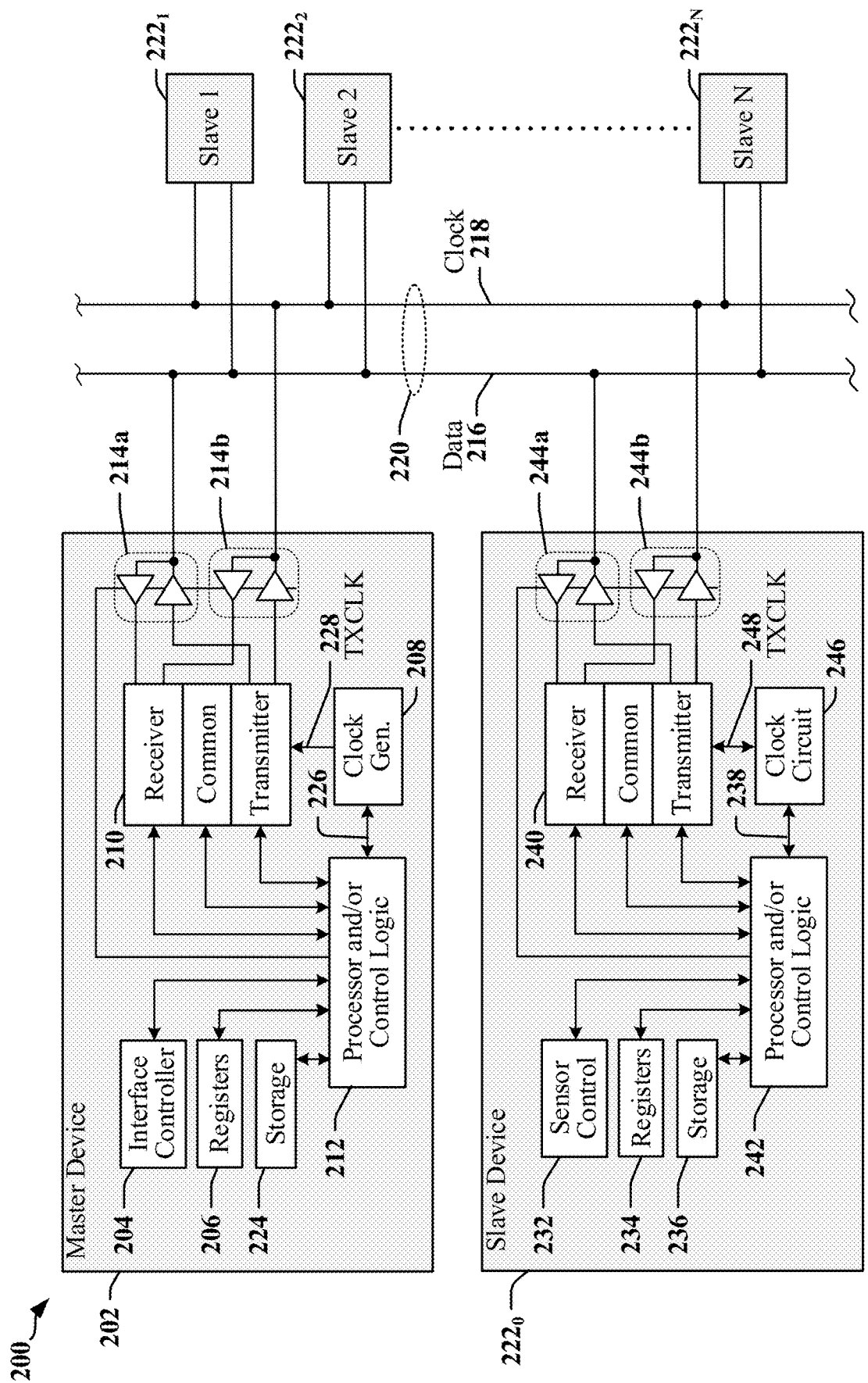
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus master devices 202.

In one example, a master device 202 may include an interface controller 204 that manages access to the serial bus, configures dynamic addresses for slave devices $222_0$-$222_N$ and/or generates a clock signal 228 to be transmitted on a clock line 218 of the serial bus 220. The master device 202 may include configuration registers 206 or other storage 224, and other control logic 212 configured to handle protocols and/or higher-level functions. The control logic 212 may include a processing circuit having a processing device such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit having a processing device such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with RFFE, I2C, I3C, SPMI, or other protocol. In some instances, two or more devices 202, $222_0$-$222_N$ may be configured to operate as a bus master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, data is transmitted on a data line 216 of the serial bus 220 based on timing information provided in a clock signal transmitted on the clock line 218 of the serial bus 220. In some instances, data may be encoded in the signaling state, or transitions in signaling state of both the data line 216 and the clock line 218.

Figure 3:
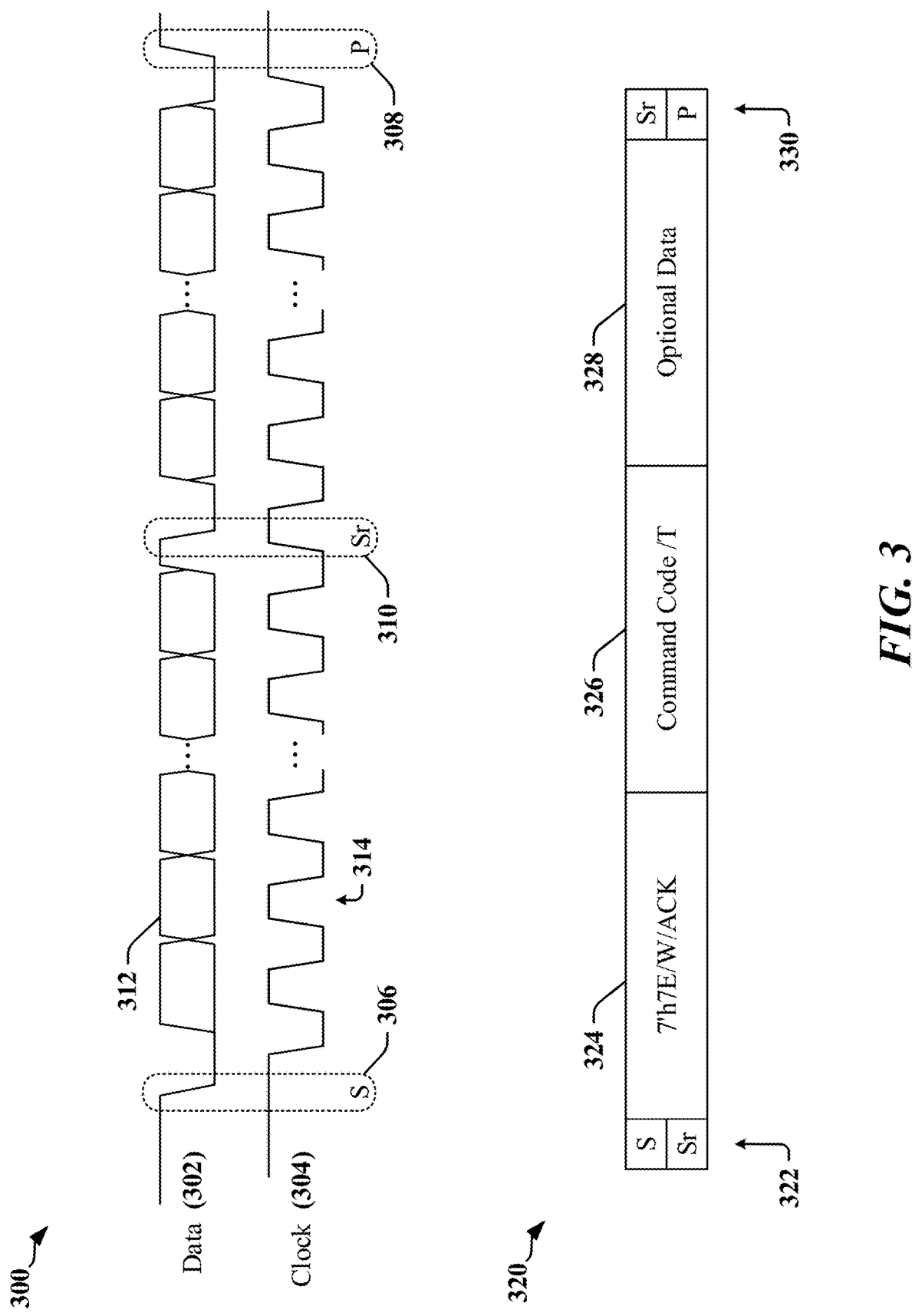
FIG. 3 includes a timing diagram that illustrates signaling on a serial bus when the serial bus is operated in a single data rate (SDR) mode of operation defined by I3C specifications.

FIG. 3 includes a timing diagram 300 that illustrates signaling on a serial bus when the serial bus is operated in a single data rate (SDR) mode of operation defined by I3C specifications. Data transmitted on a first wire (the Data wire 302) of the serial bus may be captured using a clock signal transmitted on a second wire (the Clock wire 304) of the serial bus. During data transmission, the signaling state 312 of the Data wire 302 is expected to remain constant for the duration of the pulses 314 when the Clock wire 304 is at a high voltage level. Transitions on the Data wire 302 when the Clock wire 304 is at the high voltage level indicate a START condition 306, a STOP condition 308 or a repeated START 310.

On an I3C serial bus, a START condition 306 is defined to permit the current bus master to signal that data is to be transmitted. The START condition 306 occurs when the Data wire 302 transitions from high to low while the Clock wire 304 is high. The bus master may signal completion and/or termination of a transmission using a STOP condition 308. The STOP condition 308 is indicated when the Data wire 302 transitions from low to high while the Clock wire 304 is high. A repeated START 310 may be transmitted by a bus master that wishes to initiate a second transmission upon completion of a first transmission. The repeated START 310 is transmitted instead of, and has the significance of a STOP condition 308 followed immediately by a START condition 306. The repeated START 310 occurs when the Data wire 302 transitions from high to low while the Clock wire 304 is high.

The bus master may transmit an initiator 322 such as a START condition 306 or a repeated START 310 prior to transmitting a broadcast address or unique address of a slave, a command, and/or data. FIG. 3 illustrates a command code transmission 320 by the bus master. The initiator 322 may be followed in transmission by a reserved address 324 indicating that a command code 326 is to follow. The command code 326 may, for example, cause the serial bus to transition to a desired mode of operation. Data 328 may be transmitted in some instances. The command code transmission 320 may be ended by a terminator 330 such as a STOP condition 308 or a repeated START 310.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal.

Figure 4:
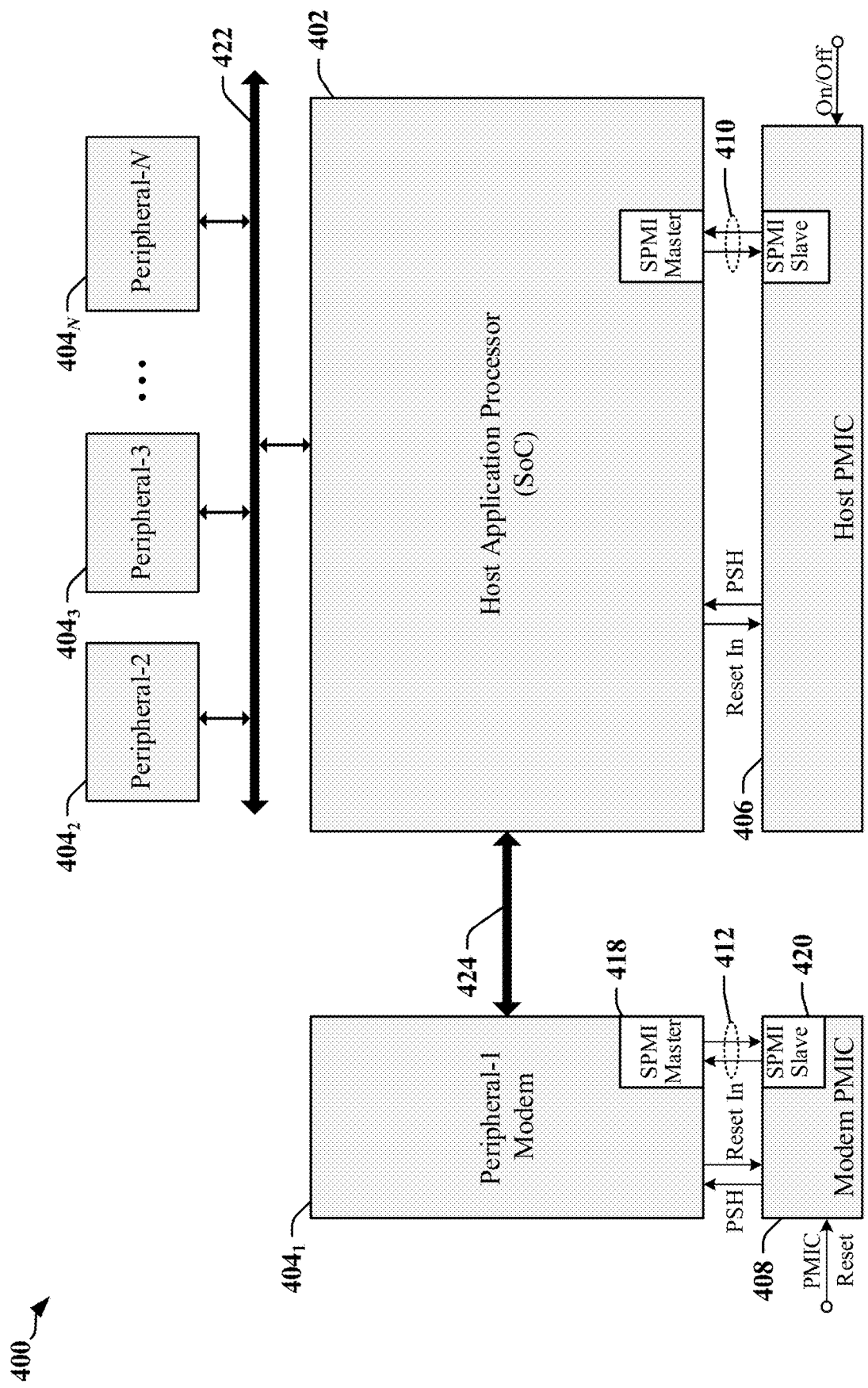
FIG. 4 illustrates a system that includes a data communication link configured as a two-wire serial bus operated in accordance with SPMI protocols.

The MIPI Alliance SPMI protocols and standards specify a hardware interface that may be implemented between baseband or application processors and peripheral components to support a variety of data communication functions including data communication related to power management operations. FIG. 4 illustrates an example of a system 400 which includes two data communication links 410, 412, where each data communication link 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem $404_1$ with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be used as a shared bus that provides high-speed, low-latency connection for devices, where data transmissions may be managed, according to priorities assigned to different traffic classes.

In the system 400 illustrated in FIG. 4, the application processor 402 that may serve as a host device on various data communication links 410, 412, 422, 424, multiple peripherals $404_1$-$404_N$, and one or more PMICs 406. The application processor 402 and the modem $404_1$ may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408. The application processor 402 may be coupled to each of the peripherals $404_1$-$404_N$ using different types of data communication links 422, 424. For example, the data communication links 422, 424 may be operated in accordance with protocols such as RFFE, SPMI, I3C protocols.

Figure 5:
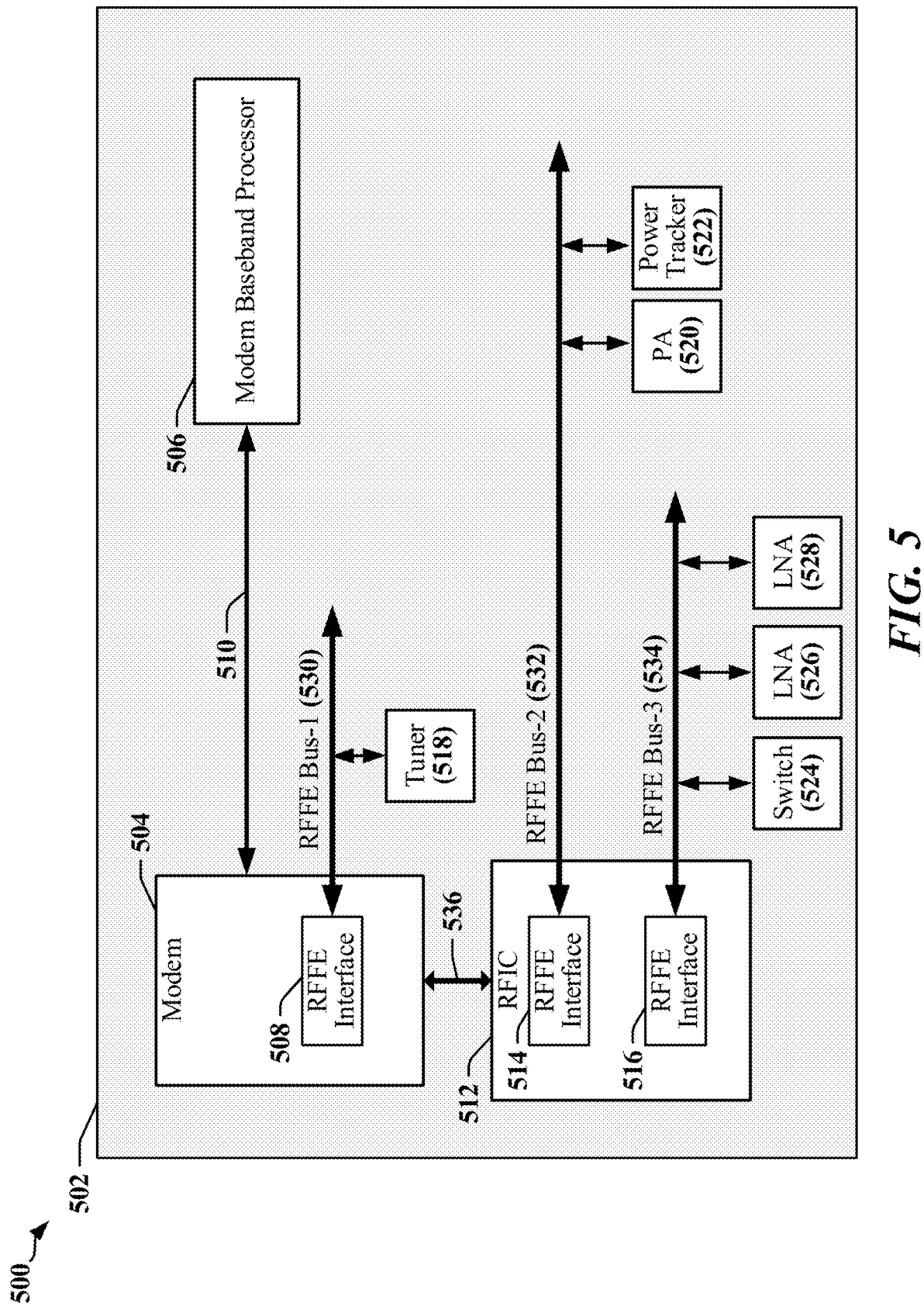
FIG. 5 illustrates a device configuration for coupling various radio frequency front-end devices using multiple RFFE buses.

FIG. 5 illustrates certain aspects of an apparatus 500 that includes multiple RFFE buses 530, 532, 534 coupled to various RF front-end devices 518, 520, 522, 524, 526, 528. A modem 502 includes an RFFE interface 508 that couples the modem 502 to a first RFFE bus 530. The modem 502 may communicate with a baseband processor 506 and a Radio-Frequency IC (RFIC 512) through one or more communication links 510, 536. The illustrated apparatus 500 may be embodied in one or more of a mobile communication device, a mobile telephone, a mobile computing system, a mobile telephone, a notebook computer, a tablet computing device, a drone, an appliance, a sensor, a media player, a gaming device, a wearable computing and/or communications device, an appliance, or the like.

In various examples, the apparatus 500 may be implemented with one or more baseband processors 506, modems 504, RFICs 512, multiple communications links 510, 536, multiple RFFE buses 530, 532, 534 and/or other types of buses. The apparatus 500 may include other processors, circuits, modules and may be configured for various operations and/or different functionalities. In the example illustrated in FIG. 5, the modem 504 is coupled to an RF tuner 518 through its RFFE interface 508 and the first RFFE bus 530. The RFIC 512 may include one or more RFFE interfaces 514, 516, controllers, state machines and/or processors that can configure and control certain aspects of the RF front-end. The RFIC 512 may communicate with a PA 520 and a power tracking module 522 through a first of its RFFE interfaces 514 and the second RFFE bus 530. The RFIC 512 may communicate with a switch 524 and one or more LNAs 526, 528.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 524, LNAs 526, 528, PAs 520 and other types of device that operate concurrently in a manner that can generate inter-device interference, or that could potentially cause damage to one or more active devices through high-power electromagnetic interference. Devices that may interfere with one another may exchange coexistence management (CxM) messages to permit each device to signal imminent actions that may result in interference or conflict. CxM messages may be used to manage operation of shared components including a switch 524, LNA 526, 528, PA 520 and/or an antenna.

RFFE, SPMI and certain other protocols that provide communication over a multi-drop serial bus can have certain common features. In one example, the structure of datagrams used to transmit command, control and data payloads over multi-drop serial buses may exhibit some similarities between protocols. In other example, similarities may exist between interrupt techniques, address assignment procedures, addresses used to select devices to receive or transmit data, clock generation and management of device priorities.

Figure 6:
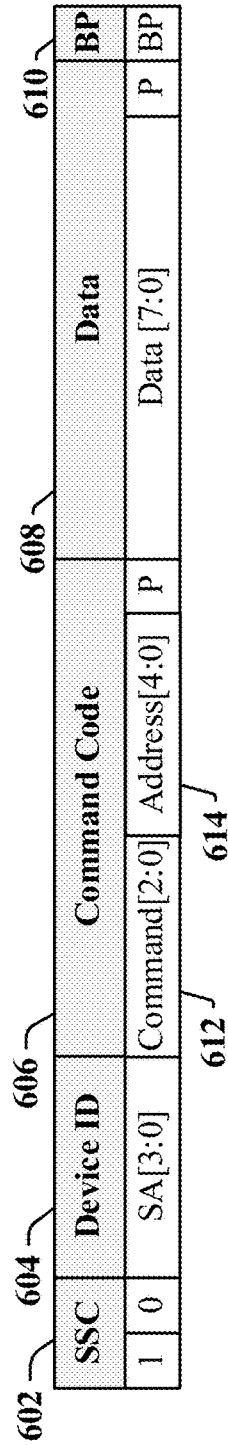
FIG. 6 illustrates datagram structures defined by RFFE and/or SPMI protocols.
Figure 6:
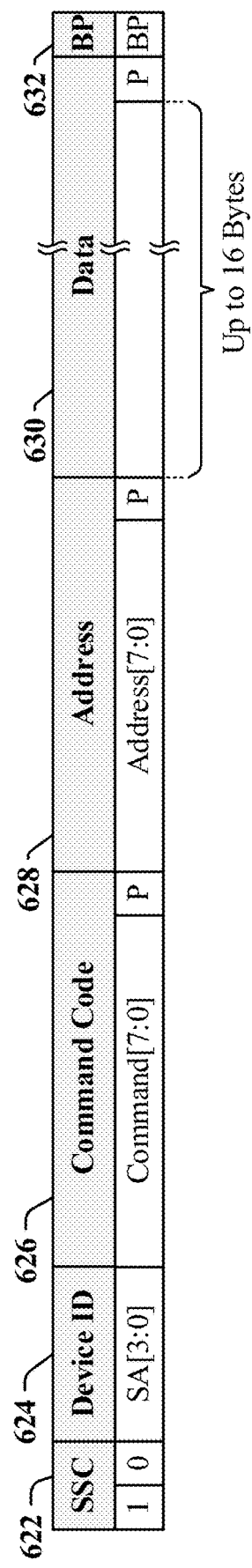

FIG. 6 illustrates datagram structures 600, 620 for a Register Write command and an Extended Register Write command. The datagram structures 600, 620 include certain elements that may be present in datagram structures defined by SPMI and/or RFFE protocols. In some instances, the datagram structures 600, 620 may be used to efficiently write data to registers within the addressable register address range of a slave device operated in accordance with SPMI and/or RFFE protocols. These datagram structures 600, 620 and similar or comparable datagram structures defined by other protocols may be adapted for use in systems implemented in accordance with certain aspects disclosed herein. The datagram structures 600, 620 commence with transmission of a two-bit sequence start condition (SSC 602, 622) followed by a four-bit device ID 604, 624. A nine-bit command field 606, 626 is transmitted next. In the Register Write command datagram structure 600, the nine-bit command field 606 includes a three-bit command code 612, a five-bit address field 614 and a parity bit. In the Extended Register Write command datagram structure 620, the nine-bit command field 606 is occupied by an eight-bit command code and a parity bit and followed by an address field 628 that carries an eight-bit register address and a parity bit. In the Register Write command datagram structure 600, a data field 608 carries a single data byte, while in the Extended Register Write command datagram structure 620 the data field 630 carries up to 16 data bytes. Each data byte is transmitted with a parity bit. Bus park signaling 610, 632 terminates the datagram structures 600, 620.

While the concepts disclosed herein are applicable to various serial bus protocols and standards, the example of RFFE protocols is frequently used herein to illustrate certain aspects of this disclosure. Continuous changes in wireless communication technologies can result in new configurations of RFFE interfaces and continually increasing complexity of RFFE bus architectures. These types of changes can increase the potential for traffic congestion on one or more RFFE buses provided in a communication device, for example. For example, RFFE bus congestion and timing bottlenecks can be expected in wireless handsets that support coexistence between 4G and 5G wireless communication technologies. In certain implementations, support for carrier aggregation (CA) can increase RFFE bus timing complexity because of increased bus contention events. For example, a BoM may be unable to dynamically communicate a large number of settings to a large number of RFFE devices within the timeline defined for communicating data frames in a 5G network, including when the number of more modes and specified behaviors for 5G networks increase.

Certain aspects of this disclosure relate to the provision of a slave device that includes expander and/or sequencer logic configured to enable the slave device to receive short commands from the BoM that cause the slave device to access registers in one or more RF devices. The expander and/or sequencer logic may be configured to execute sequences in response to the short commands. In one example, the expander and/or sequencer logic executes register writes to configure one or more RF devices, without further BoM involvement and/or without use of a bus coupling the slave device to the BoM. The expander and/or sequencer logic may cause the slave device to read or write registers in the RF devices using a serial data link protocol that has been optimized for low-latency communication. The optimized serial data link protocol may be referred to as an RFSB protocol herein, although the RFSB protocol may be used or adapted for use in other types of system. For example, a slave device that includes expander and/or sequencer logic may be adapted to control, manage or service multiple sensor devices using the RFSB protocol, or a derivative thereof, to communicate with the sensor devices.

Examples of the Use of an RFSB Interface

Figure 7:
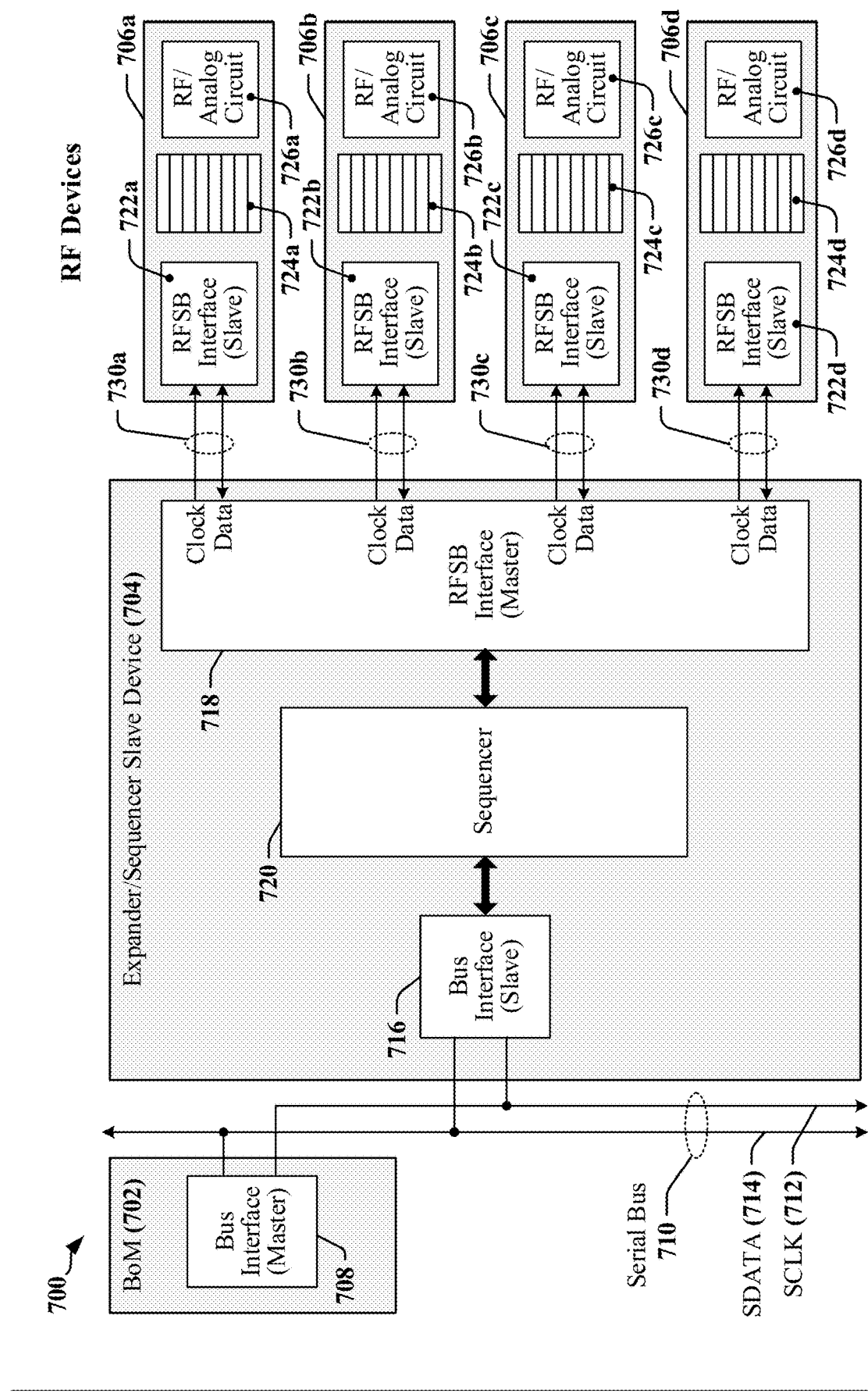
FIG. 7 illustrates a system that employs a serial bus protocol adapted in accordance with certain aspects disclosed herein.

FIG. 7 illustrates certain aspects a system 700 that employs an RFSB protocol in accordance with certain aspects disclosed herein. In the illustrated example, a slave device 704 is configured to communicate over a serial bus 710 in accordance with an RFFE protocol. For convenience, the serial bus 710 may be referred to as the primary serial bus. In some implementations, the serial bus 710 may be operated in accordance with SPMI or I3C protocols. The illustrated serial bus 710 is a two-wire bus have a clock line (SCLK 712) and a data line (SDATA 714). The serial bus 710 may correspond to the serial bus 220 of FIG. 2, one or more of the data communication links 410, 412, 422, 424 in FIG. 4 and/or an RFFE bus 530, 532, 534 illustrated in FIG. 5.

The slave device 704 may include a bus interface 716 that enables communication with a BoM device 702 over the serial bus 710. The bus interface 716 may be configurable for use with one or more protocols and may function as a slave device on the serial bus 710. Certain bus protocols enable multi-master configurations, and the bus interface 716 may be configurable for operation as a BoM in some instances. When functioning as a slave device, the bus interface 716 communicates with a corresponding bus interface 708 in a current BoM device 702. The BoM device 702 may be configured to manage and control communication over the serial bus 710.

The illustrated slave device 704 includes a sequencer 720 that can execute one or more preconfigured sequences. In one example, the preconfigured sequences may cause the slave device 704 to write and/or read a set of registers in a configured or predefined order. The set of registers may include selected registers in one or more RF devices 706a, 706b, 706c, 706d. The sequencer 720 may be implemented using a configuration of combinational logic, registers and/or flipflops. In one example, the sequencer 720 includes a microcontroller or other general-purpose processing device. In another example, the sequencer 720 includes one or more state machines that may be configurable or programmable. In another example, the sequencer 720 includes a programmable logic controller or another type of logic that is capable of performing sequences of logic-controlled steps. The sequencer 720 may perform time-driven and/or event-driven sequences. The sequencer 720 may derive time information from a locally-provided clock signal. In some instances, the sequencer 720 may derive time information from a clock signal transmitted on SCLK 712 of the serial bus 710.

The slave device 704 may access the set of registers through one or more point-to-point serial buses 730a, 730b, 730c, 730d. For convenience, the point-to-point serial buses 730a, 730b, 730c, 730d may be referred to as secondary serial buses. The point-to-point serial buses 730a, 730b, 730c, 730d may be operated in accordance with an RFSB protocol. Each point-to-point serial bus 730a, 730b, 730c, 730d in the illustrated system 700 includes clock and data lines. The slave device 704 includes a bus interface 718 that includes circuits that couple the slave device 704 to the point-to-point serial buses 730a, 730b, 730c, 730d. The bus interface 718 operates as a bus master with respect to the RF devices 706a, 706b, 706c, 706d. The bus interface 718 may manage communications in accordance with an RFSB protocol. In some instances, the point-to-point serial buses 730a, 730b, 730c, 730d may be operated in accordance with an I3C, RFFE, SPMI or other protocol.

In some implementations, the RF devices 706a, 706b, 706c, 706d may perform one or more of the functions associated with the RF front-end devices 518, 520, 522, 524, 526, 528 illustrated in FIG. 5. In the illustrated system 700, each of the RF devices 706a, 706b, 706c, 706d includes a bus interface 722a, 722b, 722c, 722d that enables communication with the slave device 704 over a respective point-to-point serial bus 730a, 730b, 730c, 730d. The bus interfaces 722a, 722b, 722c, 722d may be configurable for use with the RFSB protocol and/or one or more other protocols. Each bus interface 722a, 722b, 722c, 722d may function as a slave device on the respective point-to-point serial bus 730a, 730b, 730c, 730d. Each bus interface 722a, 722b, 722c, 722d communicates with the bus interface 716 of the slave device 704 that manages and controls communication over the point-to-point serial buses 730a, 730b, 730c, 730d.

In the illustrated system 700, each of the RF devices 706a, 706b, 706c, 706d includes a set of registers 724a, 724b, 724c, 724d that is addressable using the RFSB protocol. The slave device 704 may read and write individual registers and/or read or write a batch of registers located at consecutive addresses using commands provided by the RFSB protocol. In some implementations, certain of the registers 724a, 724b, 724c, 724d may be used to configure components such as sensors, RF circuits and/or analog circuits 726a, 726b, 726c, 726d. In some implementations, certain of the registers 724a, 724b, 724c, 724d may be used to maintain status information or data received from the sensors, RF circuits and/or analog circuits 726a, 726b, 726c, 726d.

In an example of operation, the BoM device 702 may transmit a command to the slave device 704 to initiate actions involving one or more of the RF devices 706a, 706b, 706c, 706d. The command may cause the sequencer 720 to perform a sequence of register accesses, including register read and register write accesses. The BoM device 702 does not participate further in the sequence of register accesses. In one example, the slave device 704 uses type and/or content of the command received from the BoM device 702 to select a preconfigured sequence for execution from multiple preconfigured sequences. The preconfigured sequence, when executed, may include or generate the sequence of register accesses.

Certain advantages accrue from using the sequencer 720 to perform the sequence of register accesses. For instance, the BoM device 702 can configure multiple RF devices 706a, 706b, 706c, 706d by transmitting a single command over a serial bus 710, where the command may be a short command. The use of a single command can reduce traffic on a busy serial bus 710, including in 4G/5G wireless communication devices that are experiencing ever-increasing complexity and traffic. The slave device 704 can use the sequencer 720 to expand the short commands transmitted by the BoM device 702 by executing a sequence of register programming under internal control and without involvement of the serial bus 710 or BoM device 702. In addition to reducing congestion, a slave device 704 equipped with a sequencer 720 can provide improved performance when high congestion or high latency is observed on the serial bus 710.

The use of the sequencer 720 can reduce overall power consumption by RF modules. The current consumed by operations of the serial bus 730a, 730b, 730c, 730d can be substantially less than the current that would be consumed if the same operations were conducted on a single RFFE bus. Each interface coupled to the RFFE bus presents a load that can increase the current drive of a transmitting interface. According to certain aspects of this disclosure, an RFSB bus may have a point-to-point architecture and can minimize the current consumption attributable to each register read or write operation.

In some implementations, a slave device 704 equipped with a sequencer 720 can be deployed as a hub device that receives BoM commands and expands them to a series of register programming commands for multiple downstream RF components on a module. The RF components may include PAs, LNAs, filters, switches, etc. The hub may interpret and expand commands received from the BoM device 702, which may be a modem or application processor, and may expand the commands into register settings for downstream RF devices 706a, 706b, 706c, 706d.

In some implementations, one or more of the point-to-point serial buses 730a, 730b, 730c, 730d may be operated in accordance with an I3C, RFFE, SPMI or other general-purpose serial bus protocol. Timing efficiencies, minimized physical real estate overhead and simplified design can be attained when the presently-disclosed RFSB protocol is used to couple RF devices 706a, 706b, 706c, 706d to a slave device 704 equipped with a sequencer 720. The selection of protocols for controlling the point-to-point serial buses 730a, 730b, 730c, 730d may be selected based on configuration of the system 700. For example, the physical layout of circuits and components, and proximity to another serial bus may indicate which protocol should be used. The capabilities of the RF devices 706a, 706b, 706c, 706d may also be considered when selecting a protocol.

The RFSB protocol disclosed herein may be used within SoC devices, and/or between IC devices. For example, the RFSB protocol can support intra-module communication (within a single RF module) and can support communication between RF modules. According to certain aspects of the disclosure, an RFSB interface provides an optimized and minimized overhead when deployed in intra-module communications that can operate at faster data rates than other interfaces, or at faster effective data rates, where the effective data rate accounts for protocol overhead and/or the effect of bus congestion. The RFSB interface may use a higher-frequency transmission clock rate than the clock rate used for an RFFE interface. In one example, the serial bus 710 coupling the BoM device 702 and the slave device 704 may be operated in accordance with an RFFE protocol and the RFSB protocol controlling communication over the point-to-point serial buses 730a, 730b, 730c, 730d may operate with a higher clock frequency than the frequency of the clock signal transmitted on SCLK 712 of the serial bus 710, thereby ensuring that commands received from the BoM device 702 can be expanded by slave device 704 and timely transmitted to the appropriate RF devices 706a, 706b, 706c, 706d.

An RFSB slave device uses a simplified bus interface that can be fabricated with a smaller area footprint than conventional RFFE slaves, providing lowered device cost overhead. For example, an RFSB slave device supports less complex datagram structures and fewer commands. Address overhead can be reduced since a relatively small number of RF devices 706a, 706b, 706c, 706d may be deployed in an RF module.

The RFSB protocol disclosed herein can provide a customized and highly-optimized serial interface useable for communicating between a slave device 704 equipped with a sequencer 720 and multiple RF devices 706a, 706b, 706c, 706d in an RF module. Register values of the multiple RF devices 706a, 706b, 706c, 706d in the RF module may be sent from the slave device 704 to the RF devices 706a, 706b, 706c, 706d through a point-to-point serial interface operated in accordance with the RFSB protocol. The initiating BoM device 702 can benefit from significantly reduced volumes of traffic and the BoM device 702 can experience a reduced processing overhead when only short commands are transmitted to the slave device 704 rather than directly writing all of the register settings for each RF device 706a, 706b, 706c, 706d. The use of the RFSB protocol can provide increased speed, lower cost implementation and efficient RF module programming timelines. The slave device 704 may be locally programmed, allowing for a higher degree of configurability while reducing the overall traffic associated with the BoM device 702.

Figure 8:
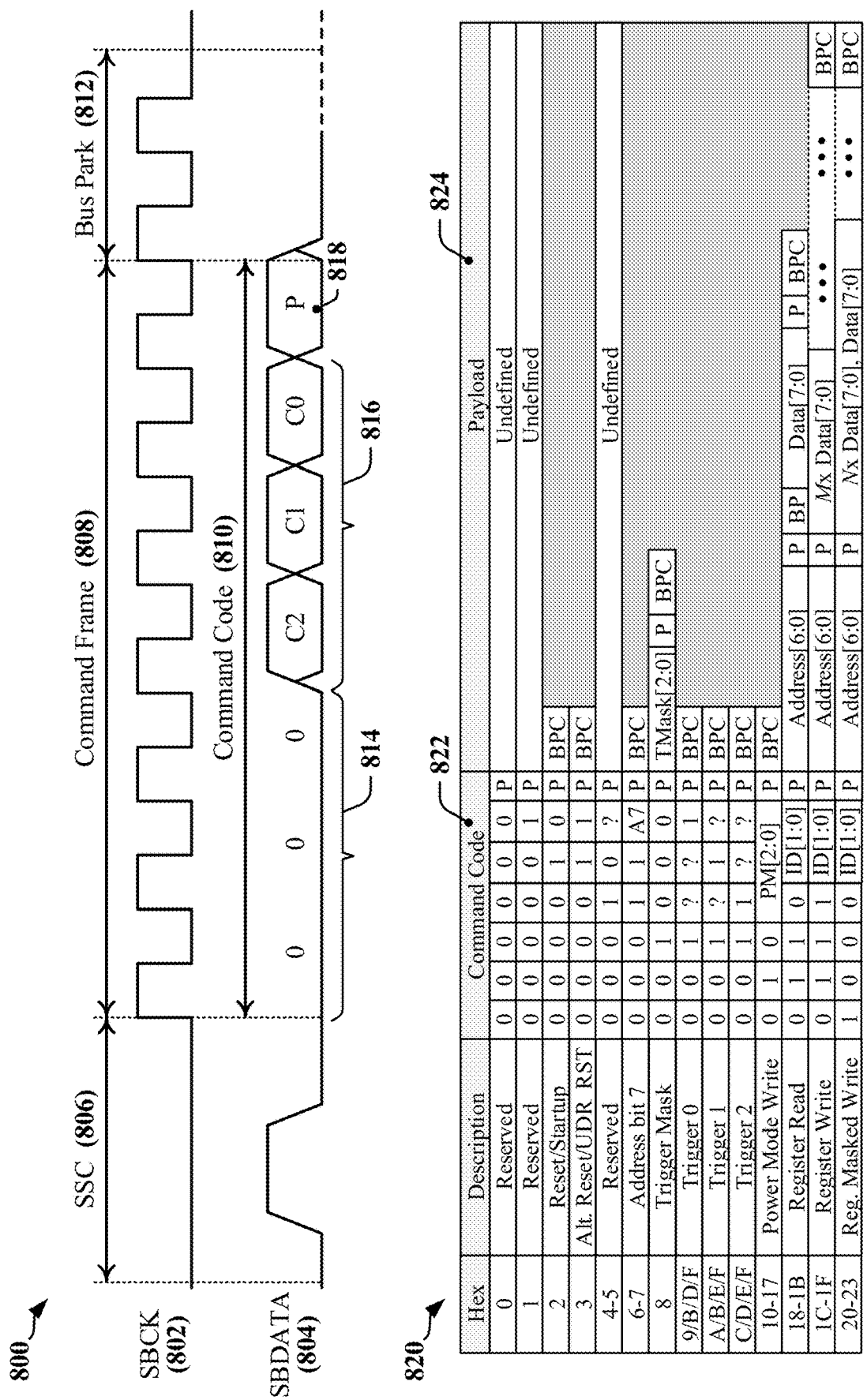
FIG. 8 illustrates an example of a command structure for a serial bus protocol adapted in accordance with certain aspects disclosed herein.

FIG. 8 illustrates an example of a command structure 800 for an RFSB protocol provided in accordance with certain aspects of this disclosure. In one aspect, the RFSB protocol may define a command structure and associated datagram structures transmitted over a serial bus that has a clock line (SBCK 802) and a data line (SBDATA 804). The table 820 illustrates examples of commands that comply with the command structure 800. In one example, the RFSB protocol and command structure 800 may be configured to support RF front-end devices. In another example, the RFSB protocol and command structure 800 may be configured to support a network of sensors.

The table 820 defines a partial set of commands corresponding to bit settings in a command code 822. In the illustrated example, the command code 822 has 6-bit value and is transmitted with a parity bit. Certain commands are transmitted with a payload 824, which may carry data, masks and/or addresses. The number of commands defined for an RFSB interface may be minimized and/or limited to basic commands. The reduced command set can minimize communication and processing overhead in slave devices and/or RF devices. Command and datagram structures may be optimized to minimize frame transmission time and the number of bits transmitted per transaction with respect to conventional RFFE command and datagram structures. Certain downstream devices may be configured to support a subset of the commands defined for the RFSB protocol.

The command structure 800 illustrates the format of certain global commands that can be transmitted with a minimized transmission time. In the illustrated example, 12 clock cycles are used to transmit a global command. A command frame 808 is transmitted in 7 clock cycles, with 5 clock cycles being used for control signaling including the SSC 806 and a bus park (BP 812). During BP 812 transmission, a driver in the transmitting device may transition its output to present a high-impedance to SBDATA 804 thereby releasing SBDATA 804 to an undriven state.

In the illustrated RFSB protocol, a command frame 808 includes a 6-bit command code 810 and 1-bit parity 818. In this example, a global command is indicated by a command code 810 that has the three most significant bits (MSBs 814) set to logic-0 and where the three least significant bits (C[2:0] 816) define the command. In one example, the global commands include:
- C[2:0]='b010: Reset(PM STARTUP) in which all registers include three internal Power Mode registers and trigger-disable registers are reset.
- C[2:0]='b011: Reset alt(UDR_RST) in which user-defined registers are reset without resetting Power Mode registers and trigger-disable registers.
- C[2:0]='b01?: Address Bit 7 value in which the value of address bit 7 is defined for paging purposes.

Other command codes for global commands may be defined and some command codes may be reserved for user-defined, application-specific or future use. The command structure 800 illustrates an example of the use of the RFSB protocol to support to RF front-end operations, although the command structure 800 may be used in other applications. The Table 820 defines additional commands including a Trigger Mask Command, a Trigger Command, a Power Mode Command, a Register Write Command, a Register Masked Write Command, and a Register Read Command.

Certain short commands are defined by the RFSB protocol to manage and/or control triggers. In one example, triggers provide a mechanism for RF front-end control, whereby certain triggers can be used to coordinate activities of different front-end components. Triggers can be used for a variety of purposes including beam steering or beamforming, gain setting, antenna path multiplexer control, etc. In some devices, triggers may be configured, activated and/or actuated over a serial bus operated in accordance with RFFE protocols. In a first example, a BoM may transmit a command that includes a trigger configuration, including an action associated with the trigger, and where receipt of the command causes the trigger to take effect or be applied upon receipt. In the latter example, the trigger configured by the command may be referred to as a self-actuating trigger. In a second example, the BoM transmits a first command that configures one or more triggers. The configuration may define an action associated with the configured triggers and may activate one or more triggers. The BoM may transmit a second command that actuates activated triggers.

Figure 9:
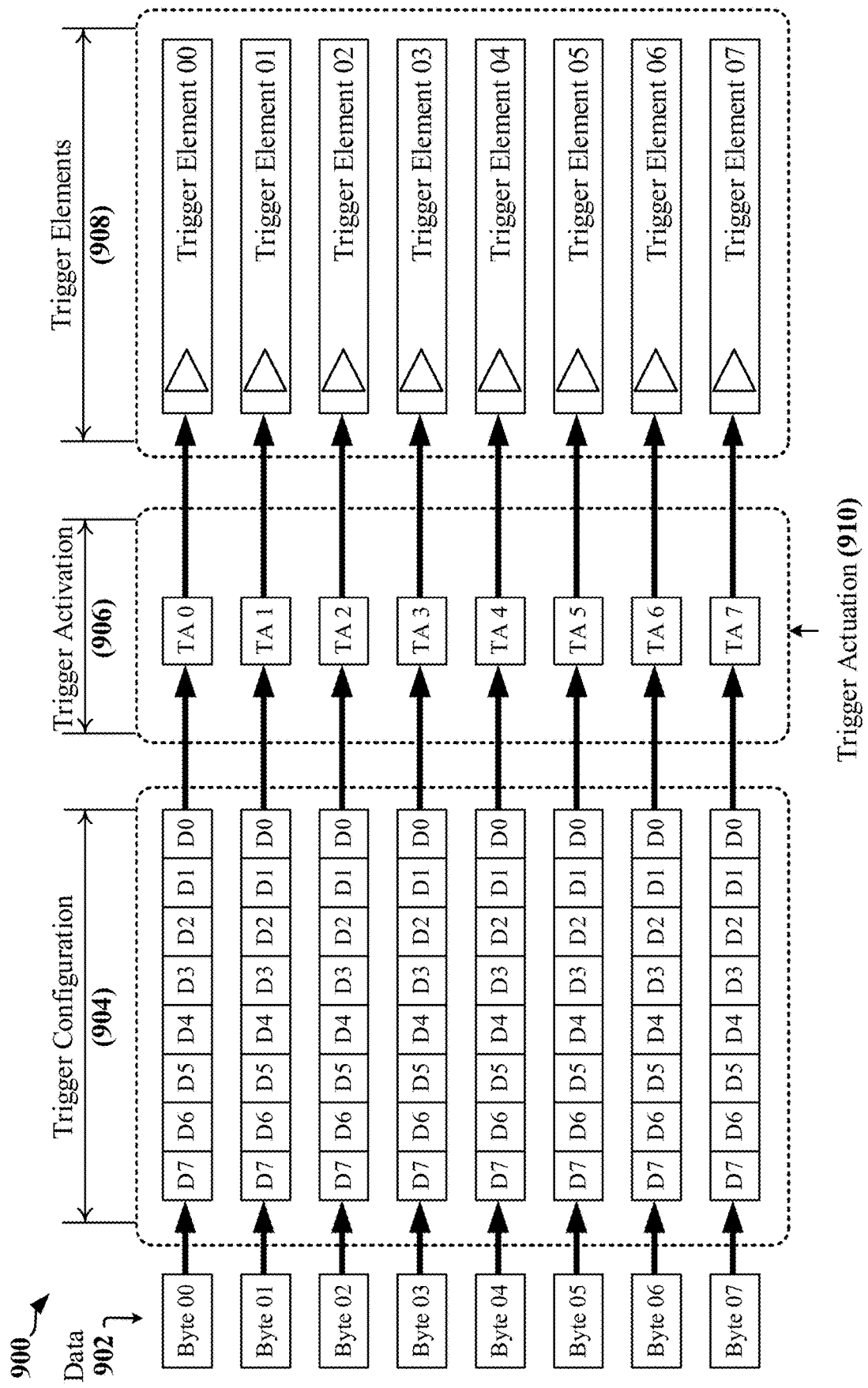
FIG. 9 illustrates actuation of triggers in accordance with certain aspects disclosed herein.

FIG. 9 illustrates a scheme 900 that illustrates actuation of activated triggers. In the illustrated example, configuration information is received as a plurality of data bytes 902, which may be stored in trigger configuration registers 904. The trigger configuration registers 904 may be written during a configuration transaction conducted over a serial bus, which may be operated in accordance with an RFFE protocol. The contents of the trigger configuration registers 904 may be forwarded to one or more target registers using a trigger activation procedure. The target registers may configure or control one or more antennas, interfaces, modems, control circuits, processors or the like. For example, changes in values stored in the target registers may cause circuits in the slave device to generate a signal, message, interrupt or other type of event.

Trigger activation logic 906 may be configured to enable the contents of the trigger configuration registers 904 to be transferred to respective target devices in response to a trigger command or trigger actuation signal 910 received from a controlling device. In conventional systems, one or more trigger actuation commands may be transmitted to trigger the activation of configuration of at least a portion of targeted trigger elements 908. The trigger elements 908 may include switches, LNAs, PAs and other types of device that operate concurrently in an RF front-end. In one example, a trigger actuation transmission may configure a mask or gating logic that determines which trigger elements 908 will receive data from the trigger configuration registers 904 during actuation initiated by the trigger actuation signal 910.

Figure 10:
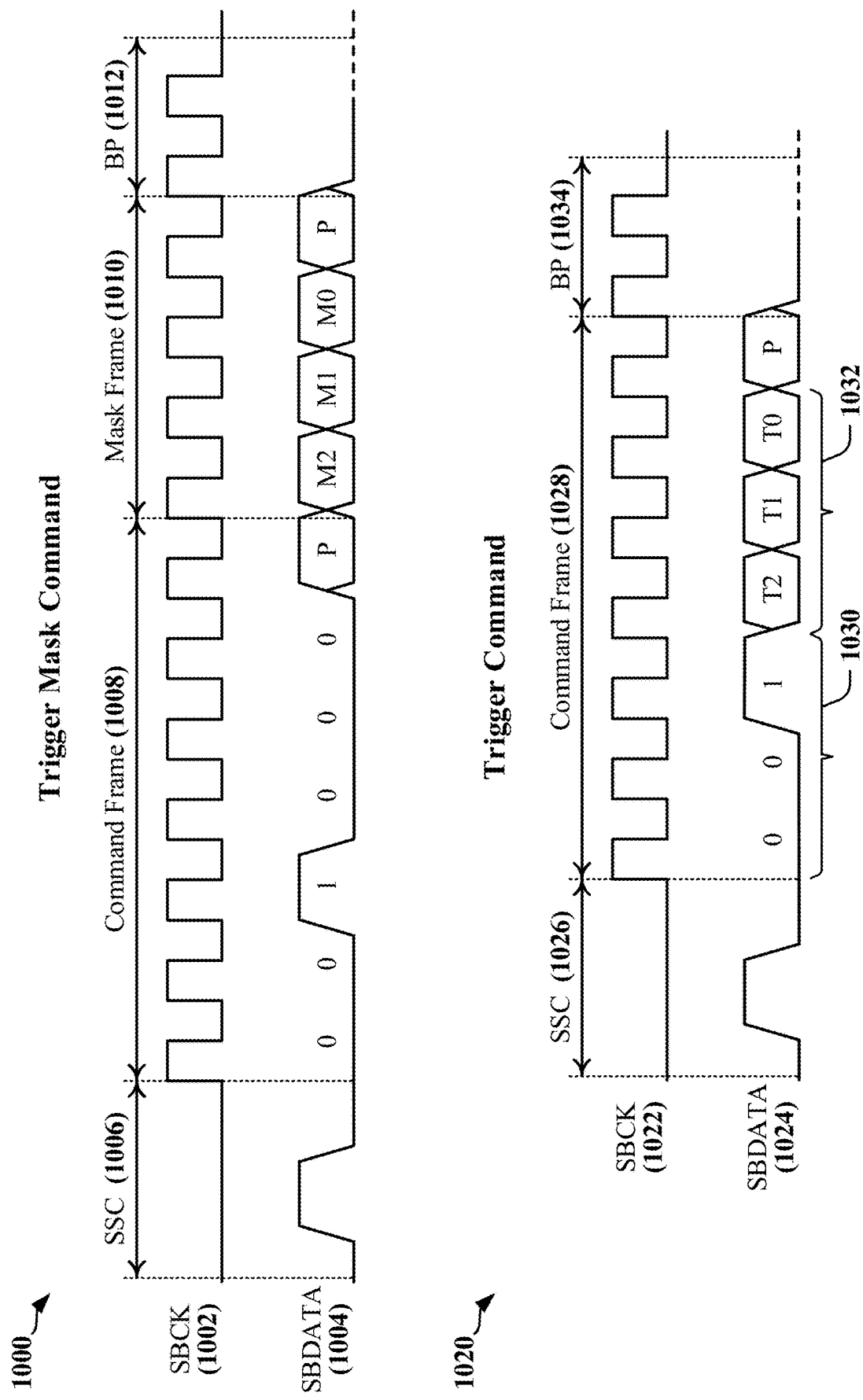
FIG. 10 illustrates trigger-related commands defined by a serial bus protocol adapted in accordance with certain aspects disclosed herein.

FIG. 10 illustrates short commands 1000, 1020 defined by an RFSB protocol to manage and/or control triggers. A first short command 1000 is defined as a trigger mask command that can be used to set or clear mask bits in a trigger actuation circuit. The trigger mask command is initiated by an SSC 1006 that is signaled using the clock line (SBCK 1002) and the data line (SBDATA 1004). The command frame 1008 carries a 6-bit command code ('b001000) followed by a parity bit. A mask frame 1010 is transmitted as a payload and includes 3 bits of mask information transmitted with a parity bit. The trigger mask command is terminated with bus park signaling (BP 1012).

A second short command 1020 is defined as a trigger command that can be used to actuate one or more triggers. The trigger command is initiated by an SSC 1026 that is signaled using the clock line (SBCK 1022) and the data line (SBDATA 1024). The command frame 1028 carries a 3-bit command code 1030 (set to 'b011), three trigger bits 1032 followed by a parity bit. The trigger command is terminated with bus park signaling (BP 1034). In one example, an RF device generates a one clock cycle strobe as a trigger signal in response to the value of one or more of the three trigger bits 1032 being set to logic-1. In this example, a Trigger Disable mode is activated when all of the three trigger bits 1032 are set to logic-0. Trigger Disable mode is deactivated when any of the three trigger bits 1032 is set to logic-1. A write command to a trigger-enabled, user-defined register may cause automatic update of both the trigger configuration register 904 and an output register corresponding to the trigger element 908. Trigger commands are typically global commands that function for all RF devices coupled to an RFSB bus.

Figure 11:
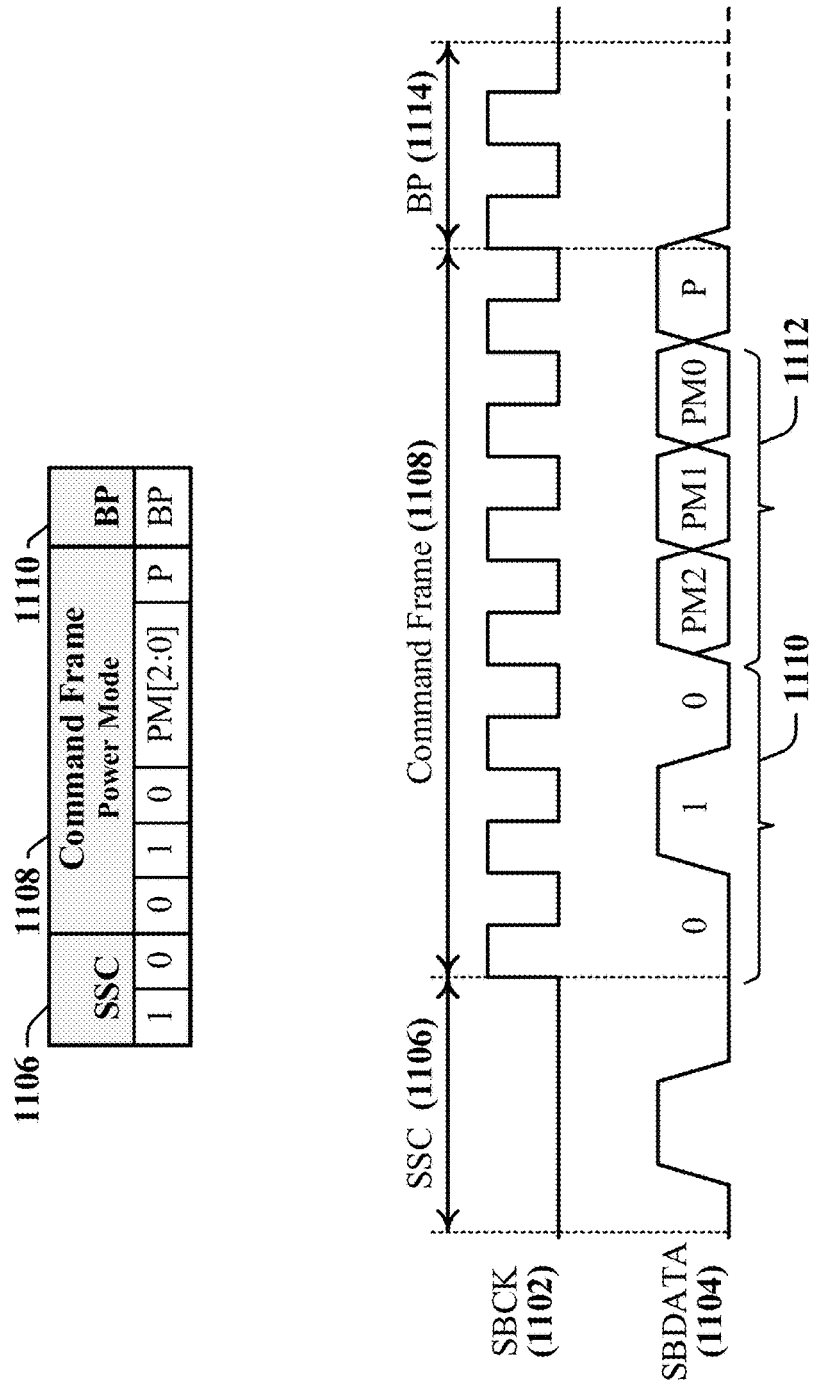
FIG. 11 illustrates power-mode commands defined by a serial bus protocol adapted in accordance with certain aspects disclosed herein.

FIG. 11 illustrates a power-mode command 1100 defined by an RFSB protocol to manage and/or control power modes in one or more RF devices. The power-mode command 1100 is a short command that is initiated by an SSC 1106 signaled using the clock line (SBCK 1102) and the data line (SBDATA 1104). The command frame 1108 carries a 3-bit command code 1110 (set to 'b010), three power-mode bits 1112 followed by a parity bit. The trigger command is terminated with bus park signaling (BP 1114). Power-mode commands 1100 are global commands that function for all RF devices coupled to an RFSB bus.

Figure 12:
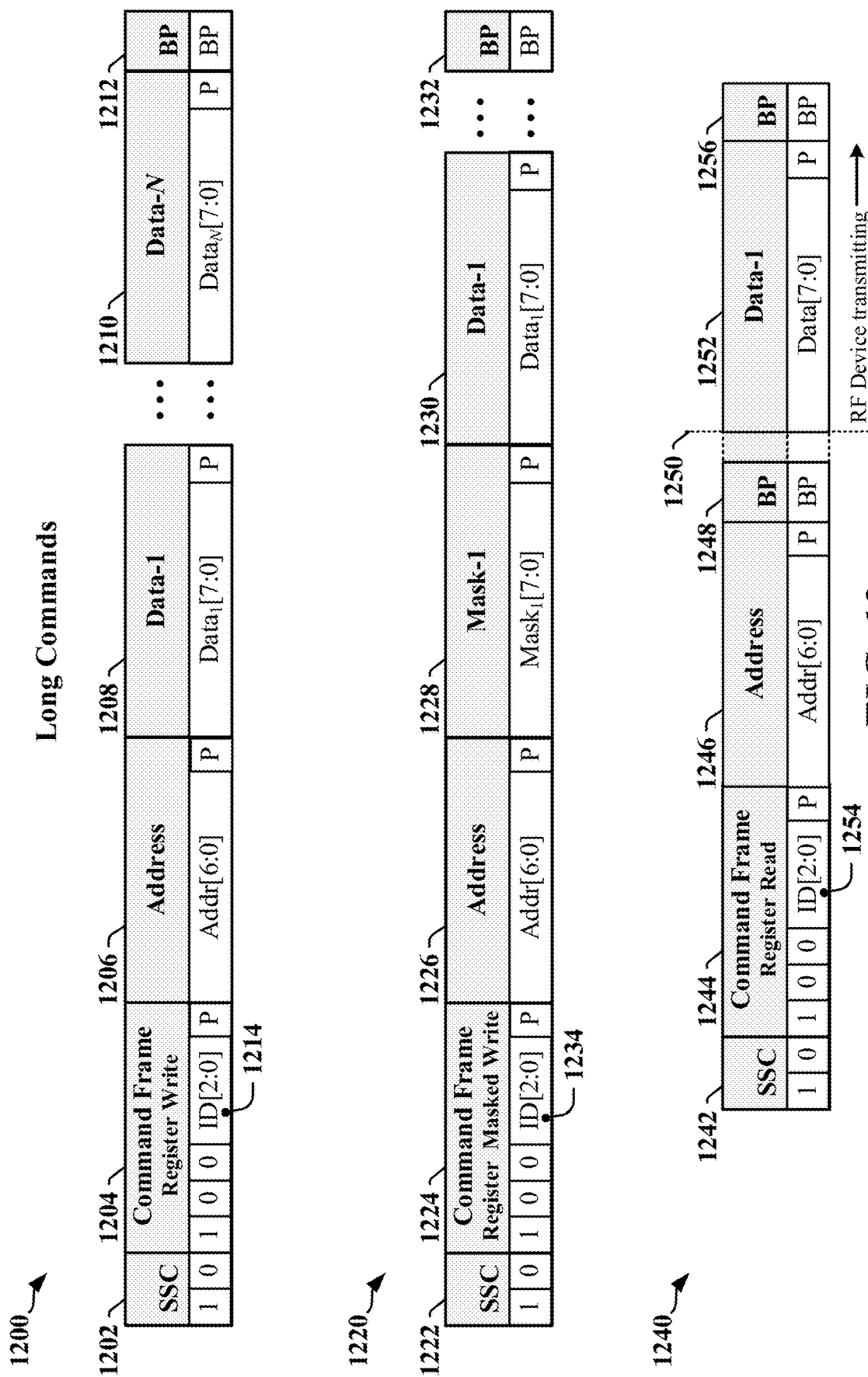
FIG. 12 illustrates read/write commands defined by a serial bus protocol adapted in accordance with certain aspects disclosed herein.

FIG. 12 illustrates long commands 1200, 1220, 1240 defined by an RFSB protocol to read or write registers. A first long command 1200 in FIG. 12 is defined as a register write command that can be used to configure the values stored in one or more registers. The register write command is a long command that supports batch writes, and that is initiated by an SSC 1202. The register write command includes a command frame 1204 that carries a 3-bit command code ('b100) and a 3-bit identifier 1214 followed by a parity bit. The payload includes an address frame 1206 configured with a register address that selects the first register to be written. The payload includes one or more data frames 1208, 1210 that include 8 bits of data and a parity bit. The register write command is terminated with bus park signaling (BP 1212). In the illustrated example, no byte count is provided that defines the number (N) of frames of data in the payload. The register write command continues for as long as there is a valid data frame to be transmitted. The first data frame 1208 is written to the register at the address identified by the address frame 1206, and after each register write, the address is incremented (e.g., by a value 0x01) to point to the next register to be written. In some implementations, the address does not wrap but stops changing at the address 0x7f. The register at address 0x7F is rewritten if additional valid data frames are available to be transmitted. The register at address 0x7F can be updated indefinitely with a single register write command.

A second long command 1220 in FIG. 12 is defined as a register masked write command that can be used to configure the values stored in one or more registers. The register masked write command is a long command that supports batch writes, and that is initiated by an SSC 1222. The register masked write command includes a command frame 1224 that carries a 3-bit command code ('b101) and a 3-bit identifier 1234 followed by a parity bit. The payload includes an address frame 1226 configured with a register address that selects the first register to be written. The payload includes a mask frame 1228 followed by a data frame 1230, each frame 1228, 1230 including 8 bits of information and a parity bit. The mask frame 1228 includes bits that define whether bits of a targeted register are to be written by corresponding bits of the data frame 1230. Multiple pairs of mask and data frames may be carried in the payload. The register masked write command is terminated with bus park signaling (BP 1232). In the illustrated example, no byte count is provided that defines the number of frames of data in the payload. The register masked write command continues for as long as there is a valid data frame to be transmitted. Bits in the first data frame 1230 that are not masked by the operation of the mask frame 1228 are written to corresponding bits in the register at the address identified by the address frame 1226, and after each register write, the address is incremented by 0x01 to point to the next register to be written. In some implementations, the address does not wrap but stops changing at the address 0x7f. The register at address 0x7F is rewritten if additional valid data frames are available to be transmitted. The register at address 0x7F can be updated indefinitely with a single register masked write command.

A third long command 1240 in FIG. 12 is defined as a register read command that can be used to read values stored in an identified register. The register read command is a long command that is initiated by an SSC 1242. The register read command includes a command frame 1244 that carries a 3-bit command code ('b100) and a 3-bit identifier 1254 followed by a parity bit. The payload includes an address frame 1246 configured with a register address that selects the register to be read. The transmitter then provides bus park signaling (BP 1248) in which it releases the data line. At a time 1250 after the data line has been released, the addressed RF device activates its line driver and transmits a data frame 1252 that includes the content of the register to be read with a parity bit. The register read command is terminated when the RF device provides bus park signaling (BP 1256).

Figure 13:
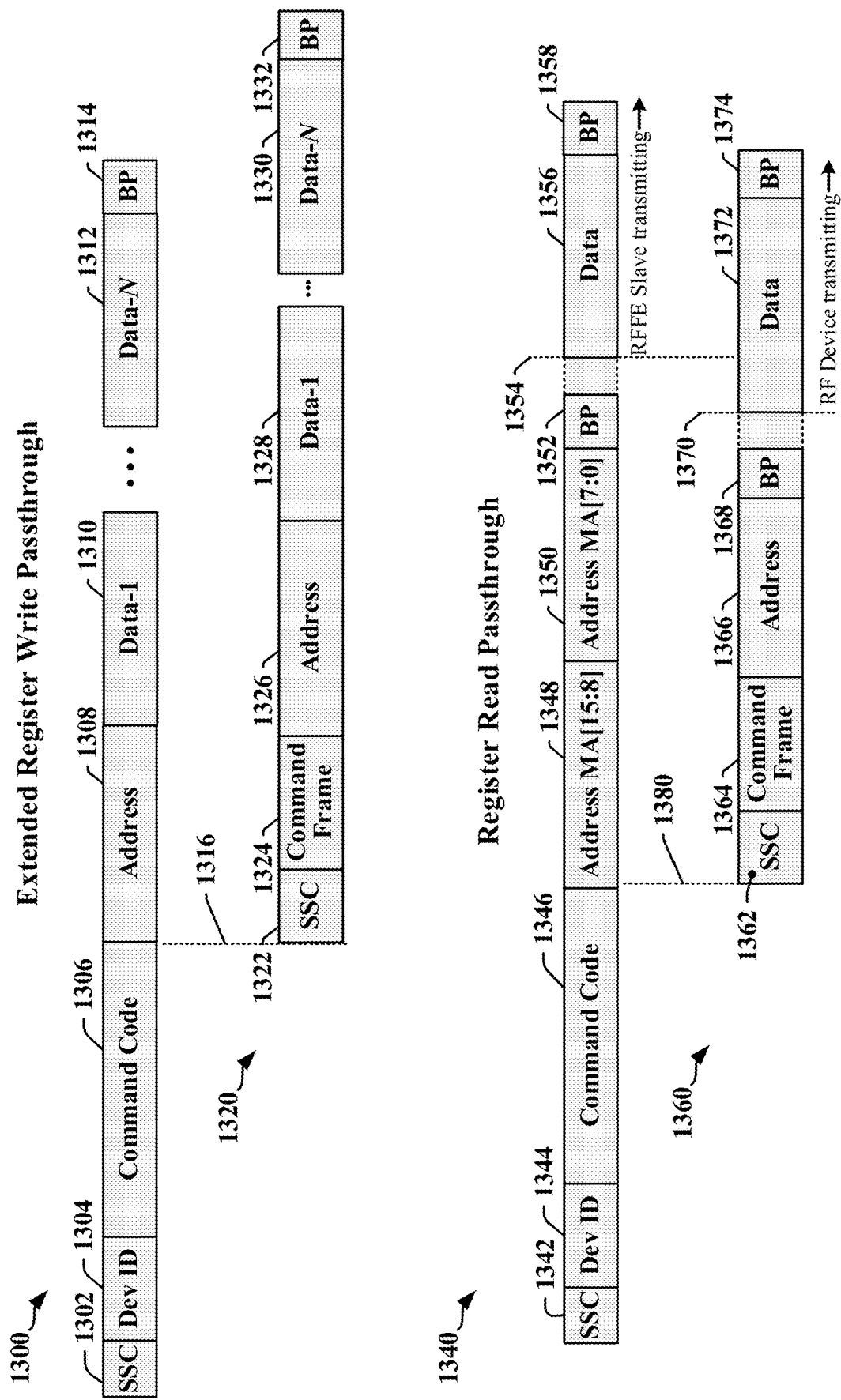
FIG. 13 illustrates examples of pass-through transactions using a serial bus protocol adapted in accordance with certain aspects disclosed herein.

FIG. 13 illustrates examples of pass-through transactions, where RFFE commands transmitted by an RFFE BoM are received by an RFFE slave device that has been adapted in accordance with certain aspects disclosed herein. The RFFE slave device may initiate a register read or write transaction with a downstream RF device as the RFFE transaction is in progress.

The first example relates to an RFFE extended register write command 1300 that causes a register write command 1320 to be transmitted by the RFFE slave device to configure the values stored in one or more registers. The RFFE extended register write command 1300 is initiated by an SSC 1302. A device identifier 1304 is transmitted followed by a command code 1306. An address frame 1308 identifies the first register to be written. One or more data frames 1310, 1312 may be transmitted and the RFFE extended register write command 1300 is terminated with bus park signaling (BP 1314).

The register write command 1320 is initiated by an SSC 1302 at a point in time 1316 after the RFFE extended register write command 1300 has commenced. In one example, the register write command 1320 may be initiated after the command code 1306 has been received from the RFFE BoM, and the nature of the command has been determined. The RFFE slave device may transmit an SSC 1322 followed by a command frame 1324 and may relay the content of the address frame 1308 received from the RFFE BoM in the address frame 1326 to select the first register to be written. The payload of the register write command 1320 includes one or more data frames 1328, 1330 received in the RFFE extended register write command 1300. The register write command is terminated with bus park signaling (BP 1332).

The second example relates to a debug mode RFFE extended register read command 1340 that causes a register read command 1360 to be transmitted by the RFFE slave device to read the value stored in a register of an RF device. The RFFE extended register read command 1340 is initiated by an SSC 1342. A device identifier 1344 is transmitted followed by a command code 1346. Address frames 1348 and 1350 identify the first register to be written. The BoM then provides bus park signaling (BP 1352) indicating release of the data line. At a time 1354 after the data line has been released, the addressed RFFE slave device activates its line driver and transmits a data frame 1356 that includes the content of the register read from the target RF device. The register read command is terminated when the RFFE slave device provides bus park signaling (BP 1358).

The register read command 1360 may be used to read values stored in the register identified by the address frames 1348 and 1350 in the RFFE extended register read command 1340. The register read command is initiated by an SSC 1362 provided at a point in time 1380 after the RFFE extended register read command 1340 has commenced. In one example, the register read command 1360 may be initiated after the command code 1346 has been received from the RFFE BoM, and the nature of the command has been determined. The register read command includes a command frame 1364 that includes an address frame 1366 configured with a register address derived from the content of the address frames 1348 and 1350 in the RFFE extended register read command 1340. The transmitter then provides bus park signaling (BP 1368) indicating release of the data line. At a time 1370 after the data line has been released, the addressed RF device activates its line driver and transmits a data frame 1372 that includes the content of the identified register. The register read command 1360 is terminated when the RF device provides bus park signaling (BP 1374).

Examples of Processing Circuits and Methods

Figure 14:
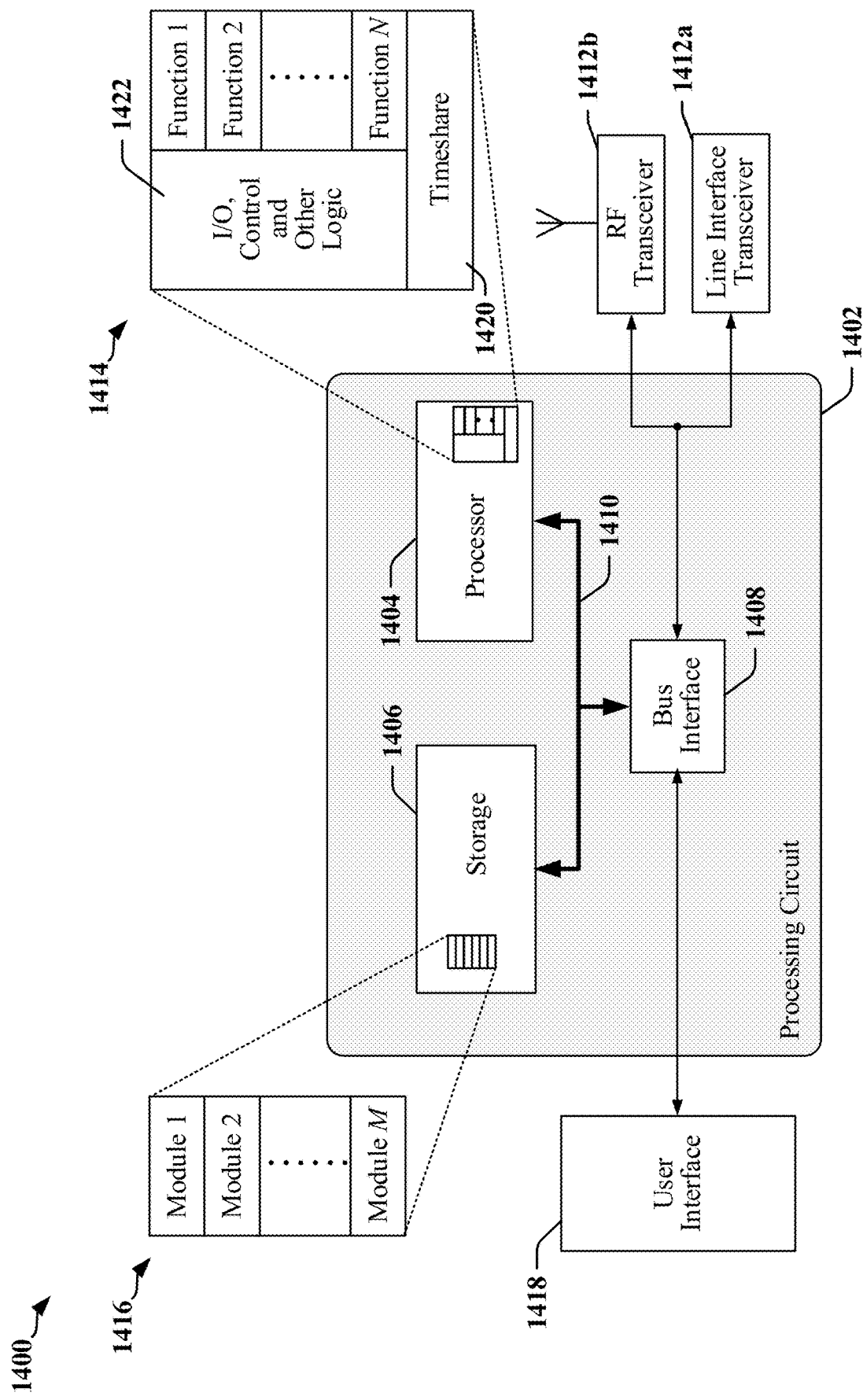
FIG. 14 illustrates one example of an apparatus employing a processing circuit that may be adapted according to certain aspects disclosed herein.

FIG. 14 is a diagram illustrating an example of a hardware implementation for an apparatus 1400. In some examples, the apparatus 1400 may perform one or more functions disclosed herein. In accordance with various aspects of the disclosure, an element, or any portion of an element, or any combination of elements as disclosed herein may be implemented using a processing circuit 1402. The processing circuit 1402 may include one or more processors 1404 that are controlled by some combination of hardware and software modules. Examples of processors 1404 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media and/or processor-readable media. The bus 1410 may also link various other circuits such as timing sources, timers, peripherals, voltage regulators, and power management circuits. A bus interface 1408 may provide an interface between the bus 1410 and one or more transceivers 1412a, 1412b. A transceiver 1412a, 1412b may be provided for each networking technology supported by the processing circuit. In some instances, multiple networking technologies may share some or all of the circuitry or processing modules found in a transceiver 1412a, 1412b. Each transceiver 1412a, 1412b provides a means for communicating with various other apparatus over a transmission medium. In one example, a transceiver 1412a may be used to couple the apparatus 1400 to a multi-wire bus. In another example, a transceiver 1412b may be used to connect the apparatus 1400 to a radio access network. Depending upon the nature of the apparatus 1400, a user interface 1418 (e.g., keypad, display, speaker, microphone, joystick) may also be provided, and may be communicatively coupled to the bus 1410 directly or through the bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement certain methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer-readable medium. The external computer-readable medium and/or storage 1406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as a transceiver 1412a, 1412b, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to a transceiver 1412a, 1412b, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412a, 1412b, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

Figure 15:
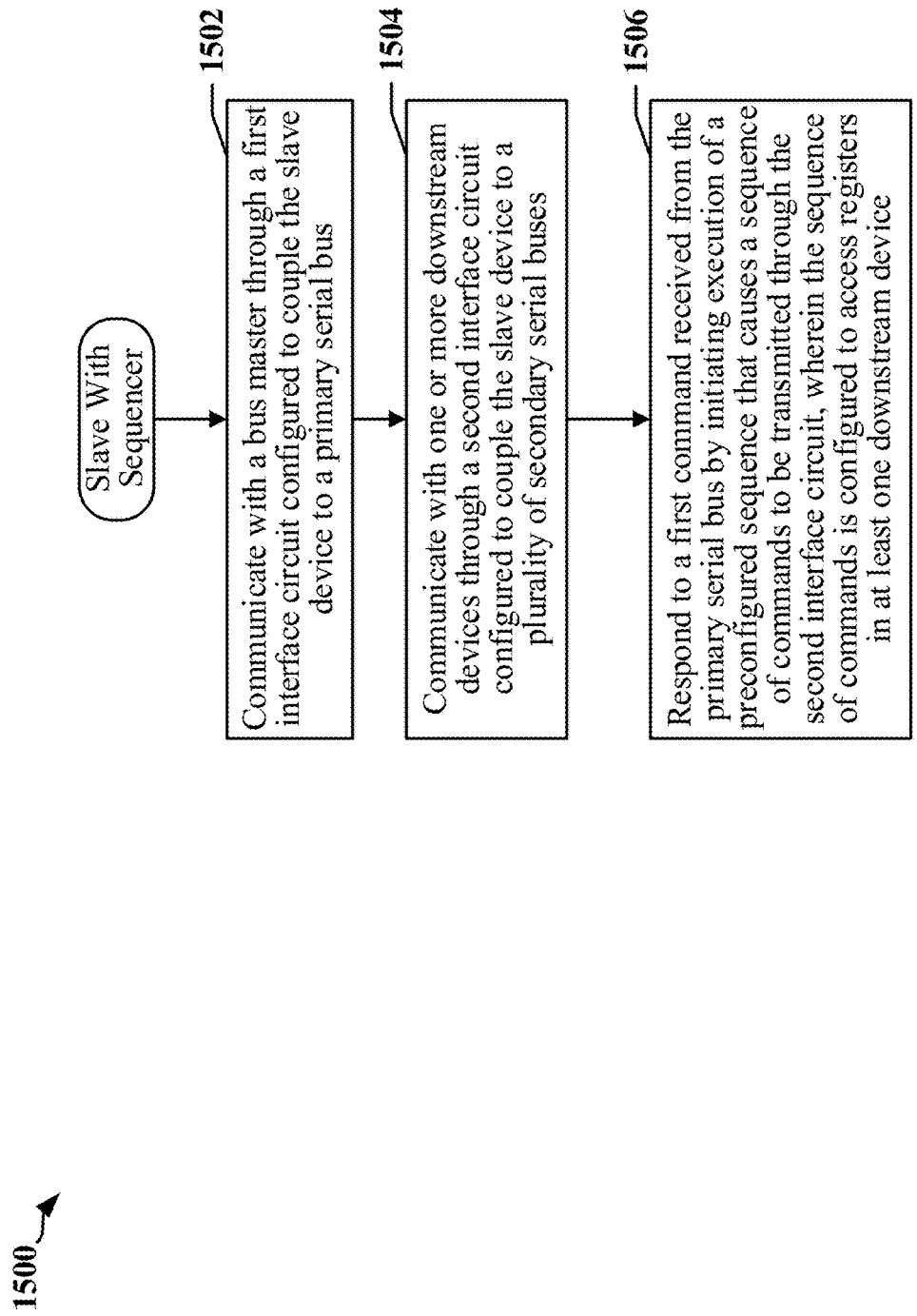
FIG. 15 is a flowchart that illustrates a method that may be performed by a slave device that is coupled to a serial bus in accordance with certain aspects disclosed herein.

FIG. 15 is a flowchart 1500 of a method that may be performed by a slave device coupled to a primary serial bus and a plurality of secondary serial buses. In one example, the primary serial bus may be operated in accordance with RFFE protocols. In another example, the primary serial bus may be operated in accordance with SPMI protocols. In one example, the primary serial bus may be operated in accordance with I3C protocols.

At block 1502, the slave device may communicate with a bus master through a first interface circuit configured to couple the slave device to the primary serial bus. At block 1504, the slave device may communicate with one or more downstream devices through a second interface circuit configured to couple the slave device to a plurality of secondary serial buses. Each of the plurality of secondary serial buses is configured as a point-to-point serial link. The downstream devices may be regarded as downstream with respect to the bus master and the slave device such that downstream data may flow from the master device to the slave device and/or from the slave device to the downstream devices, while upstream data may flow from the downstream devices to the slave device and/or from the slave device to the master device. At block 1506, the slave device may respond to a first command received from the primary serial bus by initiating execution of a preconfigured sequence that causes a sequence of commands to be transmitted through the second interface circuit. The sequence of commands may be configured to access registers in at least one downstream device.

In some instances, the sequence of commands includes a first command addressed to a register in a first downstream device coupled to a first secondary serial bus and a second command addressed to a register in a second downstream device coupled to a second secondary serial bus. The sequence of commands may include a register write command, a register masked write command or a register read command. The sequence of commands may include a trigger mask write command or a trigger command.

In some implementations, a serial bus protocol used to transmit data over the primary serial bus (e.g., RFFE, SPMI, I3C, etc.) may operate at a lower data rate than the data rate used with a different serial bus protocol to transmit data over the plurality of secondary serial buses.

In certain examples, the slave device may receive a second command from the primary serial bus, and may initiate transmission of a third command over one of the plurality of secondary serial buses in response to the second command. Transmission of the third command can commence while the second command is being received. The slave device may determine a type of the second command from a command code transmitted in second command, and may commence transmission of the third command after determining the type of the second command and before address information for the second command has been completely received.

In some implementations, the slave device may manage communication over the plurality of secondary serial buses, and may use content of the first command to select the preconfigured sequence from one or more preconfigured sequences before the first command has been completely received.

Figure 16:
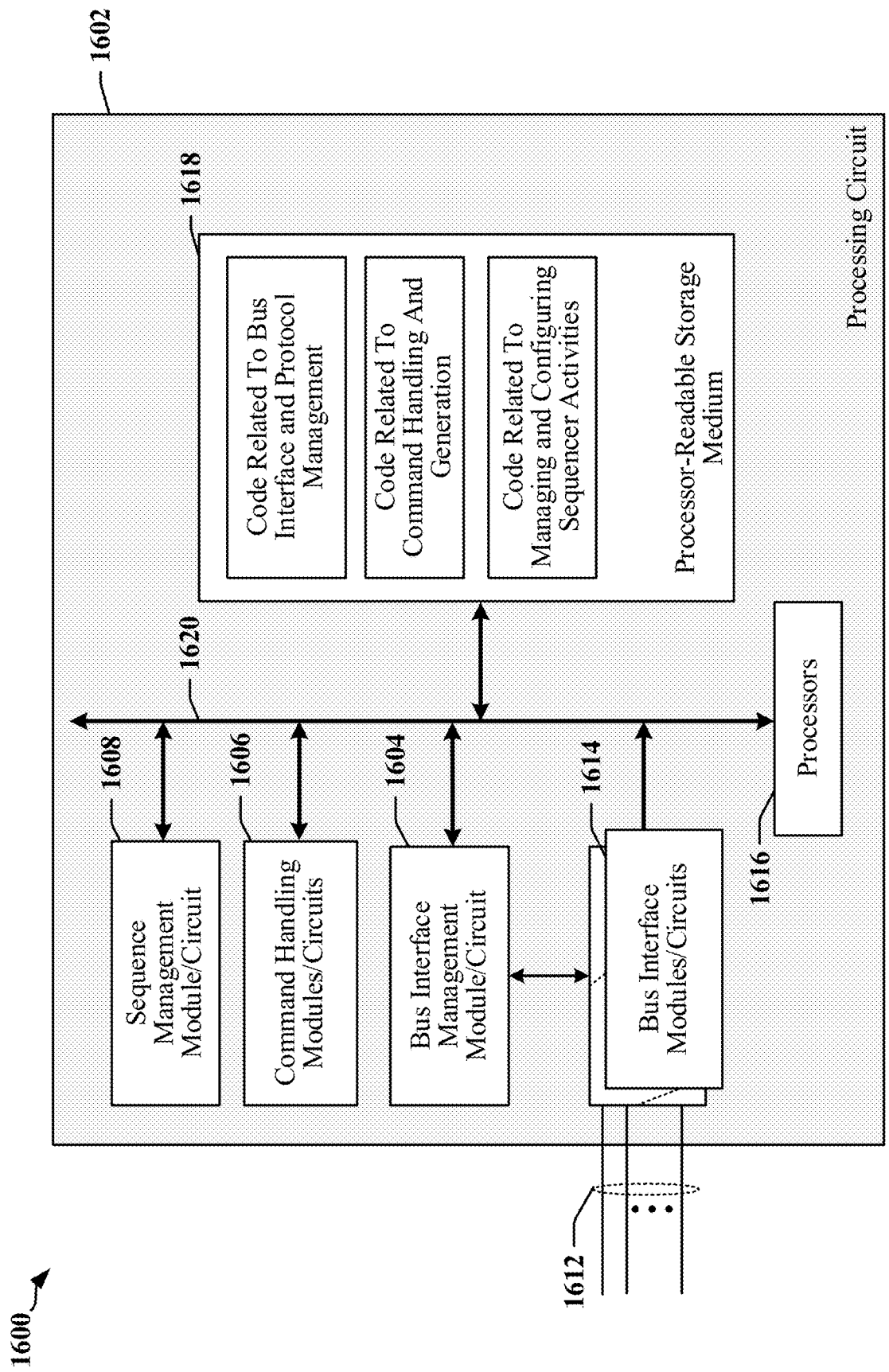
FIG. 16 illustrates a first example of a hardware implementation for an apparatus adapted in accordance with certain aspects disclosed herein.

FIG. 16 is a diagram illustrating a simplified example of a hardware implementation for an apparatus 1600 employing a processing circuit 1602. The processing circuit typically has one or more microprocessors, microcontrollers, digital signal processors, sequencers and/or state machines, represented generally by the processors 1616. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors 1616, the modules or circuits 1604, 1606 and 1608 and the processor-readable storage medium 1618. One or more bus interface circuits and/or modules 1614 may be provided to support communications over multiple serial buses 1612. The bus 1620 may also link various other circuits such as timing sources, peripherals, voltage regulators, and power management circuits, which are well known in the art, and therefore, will not be described any further.

The processors 1616 may be responsible for general processing, including the execution of software, code and/or instructions stored on the processor-readable storage medium 1618. The processor-readable storage medium 1618 may include a non-transitory storage medium. The software, when executed by the processors 1616, causes the processing circuit 1602 to perform the various functions described supra for any particular apparatus. The processor-readable storage medium may be used for storing data that is manipulated by the processors 1616 when executing software. The processing circuit 1602 further includes at least one of the modules 1604, 1606 and 1608. The modules 1604, 1606 and 1608 may be software modules running in the processors 1616, resident/stored in the processor-readable storage medium 1618, one or more hardware modules coupled to the processors 1616, or some combination thereof. The modules 1604, 1606 and 1608 may include microcontroller instructions, state machine configuration parameters, or some combination thereof.

In one configuration, the apparatus 1600 includes modules and/or circuits 1604 adapted to manage, configure and/or control bus interface circuits and/or modules 1614, and modules and/or circuits 1606 adapted to handle commands received from BoM and to generate and transmit sequences of commands through the bus interface circuits and/or modules 1614. The apparatus 1600 may include modules and/or circuits 1608 adapted to manage sequencer operations and/or select sequences to be executed.

In one example, the apparatus 1600 is configured to operate as a data communication apparatus that has a first bus interface circuit and/or module 1614 configured to couple the apparatus 1600 to a primary serial bus, second bus interface circuits and/or modules 1614 configured to couple the data communication apparatus to a plurality of secondary serial buses, and a sequencer. The sequencer may be configured to respond to a first command received from the primary serial bus by initiating execution of a preconfigured sequence that causes a sequence of commands to be transmitted through the second interface circuit. The sequence of commands may be configured to access registers in at least one device that is coupled to one of the secondary serial buses.

The sequence of commands may include a first command addressed to a register in a first device coupled to a first secondary serial bus and a second command addressed to a register in a second device coupled to a second secondary serial bus. The sequence of commands may include a register write command, a register masked write command or a register read command. The sequence of commands may include a trigger mask write command or a trigger command.

A first serial bus protocol may be used to transmit data over the primary serial bus at a first data rate, and a second serial bus protocol may be used to transmit data over the plurality of secondary serial buses at a second data rate that is greater than the first data rate.

The sequencer may be configured to receive a second command from the primary serial bus, and initiate transmission of a third command over one of the plurality of secondary serial buses in response to the second command. Transmission of the third command may commence while the second command is being received. Transmission of the third command may be initiated after a type of the second command has been determined and before address information for the second command has been completely received.

The second bus interface circuits and/or modules 1614 may be configured to manage communication over the plurality of secondary serial buses, and use content of the first command to select the preconfigured sequence from one or more preconfigured sequences before the first command has been completely received. In some instances, each of the plurality of secondary serial buses is configured as a point-to-point serial link. The primary serial bus may be operated in accordance with an RFFE, SPMI, I3C or other protocol.

The processor-readable storage medium 1618 may include instructions that cause the processing circuit 1602 to communicate with a bus master through a first interface circuit configured to couple a slave device to a primary serial bus, communicate with one or more downstream devices through a second interface circuit configured to couple the slave device to a plurality of secondary serial buses, and respond to a first command received from the primary serial bus by initiating execution of a preconfigured sequence that causes a sequence of commands to be transmitted through the second interface circuit. The sequence of commands may be configured to access registers in at least one downstream device.

A first serial bus protocol may be used to transmit data over the primary serial bus at a first data rate, and a second serial bus protocol may be used to transmit data over the plurality of secondary serial buses at a second data rate that is greater than the first data rate. Each of the plurality of secondary serial buses may be configured as a point-to-point serial link. In some implementations, the primary serial bus may be operated in accordance with an RFFE, SPMI, I3C or other protocol.

The processor-readable storage medium 1618 may include instructions that cause the processing circuit 1602 to receive a second command from the primary serial bus, and initiate transmission of a third command over one of the plurality of secondary serial buses in response to the second command. Transmission of the third command may commence while the second command is being received.

The processor-readable storage medium 1618 may include instructions that cause the processing circuit 1602 to determine a type of the second command from a command code transmitted in second command, and commence transmission of the third command after determining the type of the second command and before address information for the second command has been completely received.

The processor-readable storage medium 1618 may include instructions that cause the processing circuit 1602 to manage communication over the plurality of secondary serial buses, and use content of the first command to select the preconfigured sequence from one or more preconfigured sequences before the first command has been completely received.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A data communication apparatus comprising:
   a first interface circuit configured to couple the data communication apparatus to a primary serial bus;
   a second interface circuit configured to couple the data communication apparatus to a plurality of secondary serial buses; and
   a sequencer configured to respond to a first command received from the primary serial bus by initiating execution of a preconfigured sequence that causes a sequence of commands to be transmitted through the second interface circuit and a first secondary serial bus in the plurality of secondary serial buses, wherein the sequence of commands is configured to access one or more registers in a first device using the first secondary serial bus, the first secondary serial bus providing a first dedicated communication link between the second interface circuit and the first device.

2. The data communication apparatus of claim 1, wherein the sequence of commands includes a first command addressed to a register in the first device and a second command addressed to a register in a second device that is accessed using a second secondary serial bus in the plurality of secondary serial buses, the second secondary serial bus providing a second dedicated communication link between the second interface circuit and the second device.

3. The data communication apparatus of claim 1, wherein the sequence of commands includes a register write command, a register masked write command or a register read command.

4. The data communication apparatus of claim 1, wherein the sequence of commands includes a trigger mask write command or a trigger command.

5. The data communication apparatus of claim 1, wherein a first serial bus protocol is used to transmit data over the primary serial bus at a first data rate, a second serial bus protocol is used to transmit data over the first secondary serial bus at a second data rate that is greater than the first data rate, and a third serial bus protocol is used to transmit data over a second secondary serial bus in the plurality of secondary serial buses.

6. The data communication apparatus of claim 1, wherein the sequencer is further configured to:
   receive a second command from the primary serial bus; and
   initiate transmission of a third command addressed to a register in a second device that is accessed using a second secondary serial bus in the plurality of secondary serial buses in response to the second command, the second secondary serial bus providing a second dedicated communication link between the second interface circuit and the second device, wherein the transmission of the third command commences while the second command is being received.

7. The data communication apparatus of claim 6, wherein the transmission of the third command is initiated after a type of the second command has been determined and before address information for the second command has been completely received.

8. The data communication apparatus of claim 1, wherein the second interface circuit is further configured to:
   manage communication over the plurality of secondary serial buses,
   wherein content of the first command is used to select the preconfigured sequence from one or more preconfigured sequences before the first command has been completely received.

9. The data communication apparatus of claim 1, wherein each of the plurality of secondary serial buses is configured as a point-to-point serial link.

10. The data communication apparatus of claim 1, wherein the primary serial bus is operated in accordance with a Radio Frequency Front-End (RFFE) protocol.

11. A method of data communications at a slave device, comprising:
   communicating with a bus master through a first interface circuit configured to couple the slave device to a primary serial bus;
   communicating with one or more downstream devices through a second interface circuit configured to couple the slave device to a plurality of secondary serial buses; and
   responding to a first command received from the primary serial bus by initiating execution of a preconfigured sequence that causes a sequence of commands to be transmitted through the second interface circuit and a first secondary serial bus in the plurality of secondary serial buses, wherein the sequence of commands is configured to access one or more registers in a first downstream device using the first secondary serial bus, the first secondary serial bus providing a first dedicated communication link between the second interface circuit and the first downstream device.

12. The method of claim 11, wherein the sequence of commands includes a first command addressed to a register in the first downstream device and a second command addressed to a register in a second downstream device that is accessed using a second secondary serial bus in the plurality of secondary serial buses, the second secondary serial bus providing a second dedicated communication link between the second interface circuit and the second downstream device.

13. The method of claim 11, wherein the sequence of commands includes a register write command, a register masked write command or a register read command.

14. The method of claim 11, wherein the sequence of commands includes a trigger mask write command or a trigger command.

15. The method of claim 11, wherein a first serial bus protocol is used to transmit data over the primary serial bus at a first data rate, a second serial bus protocol is used to transmit data over the first secondary serial bus at a second data rate that is greater than the first data rate, and a third serial bus protocol is used to transmit data over a second secondary serial bus in the plurality of secondary serial buses.

16. The method of claim 11, further comprising:
   receiving a second command from the primary serial bus; and
   initiating transmission of a third command addressed to a register in a second downstream device that is accessed using a second secondary serial bus in the plurality of secondary serial buses in response to the second command, the second secondary serial bus providing a second dedicated communication link between the second interface circuit and the second downstream device, wherein the transmission of the third command commences while the second command is being received.

17. The method of claim 16, further comprising:
   determining a type of the second command from a command code transmitted in the second command; and
   initiating the transmission of the third command after determining the type of the second command and before address information for the second command has been completely received.

18. The method of claim 11, further comprising:
   managing communication over the plurality of secondary serial buses,
   wherein content of the first command is used to select the preconfigured sequence from one or more preconfigured sequences before the first command has been completely received.

19. The method of claim 11, wherein each of the plurality of secondary serial buses is configured as a point-to-point serial link.

20. The method of claim 11, wherein the primary serial bus is operated in accordance with a Radio Frequency Front-End (RFFE) protocol.

21. A processor-readable storage medium comprising code for:
   communicating with a bus master through a first interface circuit configured to couple a slave device to a primary serial bus;
   communicating with one or more downstream devices through a second interface circuit configured to couple the slave device to a plurality of secondary serial buses; and
   responding to a first command received from the primary serial bus by initiating execution of a preconfigured sequence that causes a sequence of commands to be transmitted through the second interface circuit and a first secondary serial bus in the plurality of secondary serial buses, wherein the sequence of commands is configured to access one or more registers in a first downstream device using the first secondary serial bus, the first secondary serial bus providing a first dedicated communication link between the second interface circuit and the first downstream device.

22. The processor-readable storage medium of claim 21, wherein a first serial bus protocol is used to transmit data over the primary serial bus at a first data rate, a second serial bus protocol is used to transmit data over the first secondary serial bus at a second data rate that is greater than the first data rate, and a third serial bus protocol is used to transmit data over a second secondary serial bus in the plurality of secondary serial buses, and wherein each of the plurality of secondary serial buses is configured as a point-to-point serial link.

23. The processor-readable storage medium of claim 21, further comprising code for:
receiving a second command from the primary serial bus; and
initiating transmission of a third command addressed to a register in a second downstream device that is accessed using a second secondary serial bus in the plurality of secondary serial buses in response to the second command, the second secondary serial bus providing a second dedicated communication link between the second interface circuit and the second downstream device, wherein the transmission of the third command commences while the second command is being received.

24. The processor-readable storage medium of claim 23, further comprising code for:
determining a type of the second command from a command code transmitted in the second command; and
initiating the transmission of the third command after determining the type of the second command and before address information for the second command has been completely received.

25. The processor-readable storage medium of claim 21, further comprising code for:
managing communication over the plurality of secondary serial buses,
wherein content of the first command is used to select the preconfigured sequence from one or more preconfigured sequences before the first command has been completely received.

26. A data communication apparatus comprising:
means for communicating with a bus master configured to couple the data communication apparatus to a primary serial bus;
means for communicating with one or more downstream devices configured to couple the data communication apparatus to a plurality of secondary serial buses; and
means for executing a preconfigured sequence that causes a sequence of commands to be transmitted through the means for communicating with the one or more downstream devices, wherein the preconfigured sequence is executed in response to a first command received from the primary serial bus, and wherein the sequence of commands is configured to access one or more registers in a first downstream device using a first secondary serial bus in the plurality of secondary serial buses, the first secondary serial bus providing a first dedicated communication link between the means for communicating with the one or more downstream devices and the first downstream device.

27. The data communication apparatus of claim 26, wherein a first serial bus protocol is used to transmit data over the primary serial bus at a first data rate, a second serial bus protocol is used to transmit data over the first secondary serial bus at a second data rate that is greater than the first data rate, and a third serial bus protocol is used to transmit data over a second secondary serial bus in the plurality of secondary serial buses, and wherein each of the plurality of secondary serial buses is configured as a point-to-point serial link.

28. The data communication apparatus of claim 26, wherein the means for executing the preconfigured sequence is further configured to:
initiate transmission of a third addressed to a register in a second downstream device that is accessed using a second secondary serial bus in the plurality of secondary serial buses in response to a second command received from the primary serial bus, the second secondary serial bus providing a second dedicated communication link between the means for communicating with the one or more downstream devices and the second downstream device, wherein the transmission of the third command commences while the second command is being received.

29. The data communication apparatus of claim 28, wherein the means for executing the preconfigured sequence is further configured to:
initiate the transmission of the third command after determining a type of the second command and before address information for the second command has been completely received.

30. The data communication apparatus of claim 26, wherein the means for communicating with the one or more downstream devices is further configured to manage communication over the plurality of secondary serial buses, and wherein content of the first command is used to select the preconfigured sequence from one or more preconfigured sequences before the first command has been completely received.

* * * * *